United States Patent
Arita et al.

(10) Patent No.: US 9,906,656 B2
(45) Date of Patent: Feb. 27, 2018

(54) IMAGE DATA TRANSMISSION APPARATUS, TRANSMISSION METHOD, AND IMAGE PROCESSING SYSTEM

(71) Applicants: Shunsuke Arita, Tokyo (JP); Shinya Nohdomi, Kanagawa (JP); Hidetoshi Suzuki, Kanagawa (JP); Katsunao Takahashi, Kanagawa (JP)

(72) Inventors: Shunsuke Arita, Tokyo (JP); Shinya Nohdomi, Kanagawa (JP); Hidetoshi Suzuki, Kanagawa (JP); Katsunao Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/195,974

(22) Filed: Jun. 28, 2016

(65) Prior Publication Data

US 2017/0013143 A1    Jan. 12, 2017

(30) Foreign Application Priority Data

Jul. 7, 2015   (JP) ................................. 2015-136555
May 9, 2016   (JP) ................................. 2016-094046

(51) Int. Cl.
*H04N 1/00*    (2006.01)
*H04N 1/12*    (2006.01)

(52) U.S. Cl.
CPC ..... *H04N 1/00095* (2013.01); *H04N 1/00244* (2013.01); *H04N 1/121* (2013.01)

(58) Field of Classification Search
None
See application file for complete search history.

(56) References Cited

U.S. PATENT DOCUMENTS

| | | | | |
|---|---|---|---|---|
| 5,374,965 A | * | 12/1994 | Kanno | G06F 19/321 348/705 |
| 5,557,426 A | * | 9/1996 | Sakata | H04N 9/877 348/489 |
| 2005/0213120 A1 | | 9/2005 | Ohkawa et al. | |
| 2012/0019860 A1 | | 1/2012 | Fujiwara | |
| 2012/0062930 A1 | | 3/2012 | Toyazaki | |

FOREIGN PATENT DOCUMENTS

| | | |
|---|---|---|
| JP | 2004-72571 | 3/2004 |
| JP | 4506535 | 5/2010 |
| JP | 2012-40867 | 3/2012 |
| JP | 2012-81744 | 4/2012 |
| JP | 2013-211683 | 10/2013 |
| JP | 5401948 | 11/2013 |

* cited by examiner

*Primary Examiner* — Thomas D Lee
(74) *Attorney, Agent, or Firm* — Duft Bornsen & Fettig LLP

(57) ABSTRACT

An image data transmission apparatus for transmitting image data of a plurality of planes, the image data transmission apparatus includes circuitry. The circuitry is configured to: deliver the image data to a common transmission line used for transmitting the image data of the planes; generate first timing signals indicating transmission timings of the image data of the planes for the respective planes, and generate a second timing signal indicating a transmission timing of the image data in the common transmission line based on the first timing signals for the respective planes transmitted through the common transmission line.

7 Claims, 22 Drawing Sheets

IMAGE DATA TRANSMISSION APPARATUS, TRANSMISSION METHOD, AND IMAGE PROCESSING SYSTEM

CROSS-REFERENCE TO RELATED APPLICATION

The present application claims priority under 35 U.S.C. § 119 to Japanese Patent Application No. 2015-136555, filed Jul. 7, 2015 and Japanese Patent Application No. 2016-094046, filed May 9, 2016. The contents of which are incorporated herein by reference in their entirety.

BACKGROUND OF THE INVENTION

1. Field of the Invention

The present invention relates to an image data transmission apparatus, a transmission method, and an image processing system.

2. Description of the Related Art

Conventionally, various techniques related to high-speed data transmission (transfer) have been developed. For example, in order to transfer image data of an image to be printed to a printer capable of performing high-speed printing from a print server at a sufficient speed, an interface for transferring control information such as specification of a sheet type and an interface for transferring print image data are separated and the interface for transferring the data is configured by a high-speed serial bus.

Japanese Unexamined Patent Application Publication No. 2012-40867 further discloses a technique enabling high-speed data transfer by providing data transfer controllers and data lines corresponding to respective colors of the image data.

When data is transferred using the high-speed serial bus as in the above-mentioned conventional technique, an insufficient transfer band in a certain configuration is addressed by increasing the number of lanes of the bus that is used for the data transfer, thereby ensuring a sufficient transfer band. When data having a plurality of planes (it is assumed that data for one color corresponds to one plane), such as image data, is tried to be transferred, conventionally, the data is transferred using the necessary number of lanes for each plane.

For example, even when a transfer band necessary for transferring image data of one plane at a speed appropriate for a print speed is slightly larger than a transfer band provided by one lane, two lanes of the bus are used per plane in order to provide a sufficient transfer speed. The conventional system therefore needs more lanes for the bus relative to the transfer band required as a whole in some cases, resulting in a problem of increased cost including the cost of cables.

The above-described problem can occur in the same manner when data having a plurality of planes is tried to be transmitted in transmission (transfer) of data other than the image data or data transmission between apparatuses other than the printer and the print server.

SUMMARY OF THE INVENTION

According to one aspect of the present invention, there is provided an image data transmission apparatus for transmitting image data of a plurality of planes, the image data transmission apparatus including: circuitry configured to: deliver the image data to a common transmission line used for transmitting the image data of the planes; generate first timing signals indicating transmission timings of the image data of the planes for the respective planes; and generate a second timing signal indicating a transmission timing of the image data in the common transmission line based on the first timing signals for the respective planes transmitted through the common transmission line.

According to another aspect of the present invention, there is provided an image data transmission method of transmitting image data of a plurality of planes, the image data transmission method including: using a common transmission line that is used for transmitting the image data of the planes as a transmission line for transmitting the pieces of image data; generating first timing signals indicating transmission timings of the image data of the planes for the respective planes, and generating a second timing signal indicating a transmission timing of the image data in the common transmission line based on the first timing signals for the planes that are transmitted through the common transmission line.

According to still another aspect of the present invention, there is provided an image processing system configured to include a plurality of apparatuses and transmits image data of a plurality of planes between the apparatuses, the image processing system including: a common transmission line configured to be used for transmitting the image data of the planes, the common transmission line serving as a transmission line for transmitting the image data between the apparatuses; and circuitry configured to: generate first timing signals indicating transmission timings of the pieces of image data of the planes for the respective planes, and generate a second timing signal indicating a transmission timing of the image data in the common transmission line based on the first timing signals for the planes transmitted through the common transmission line.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
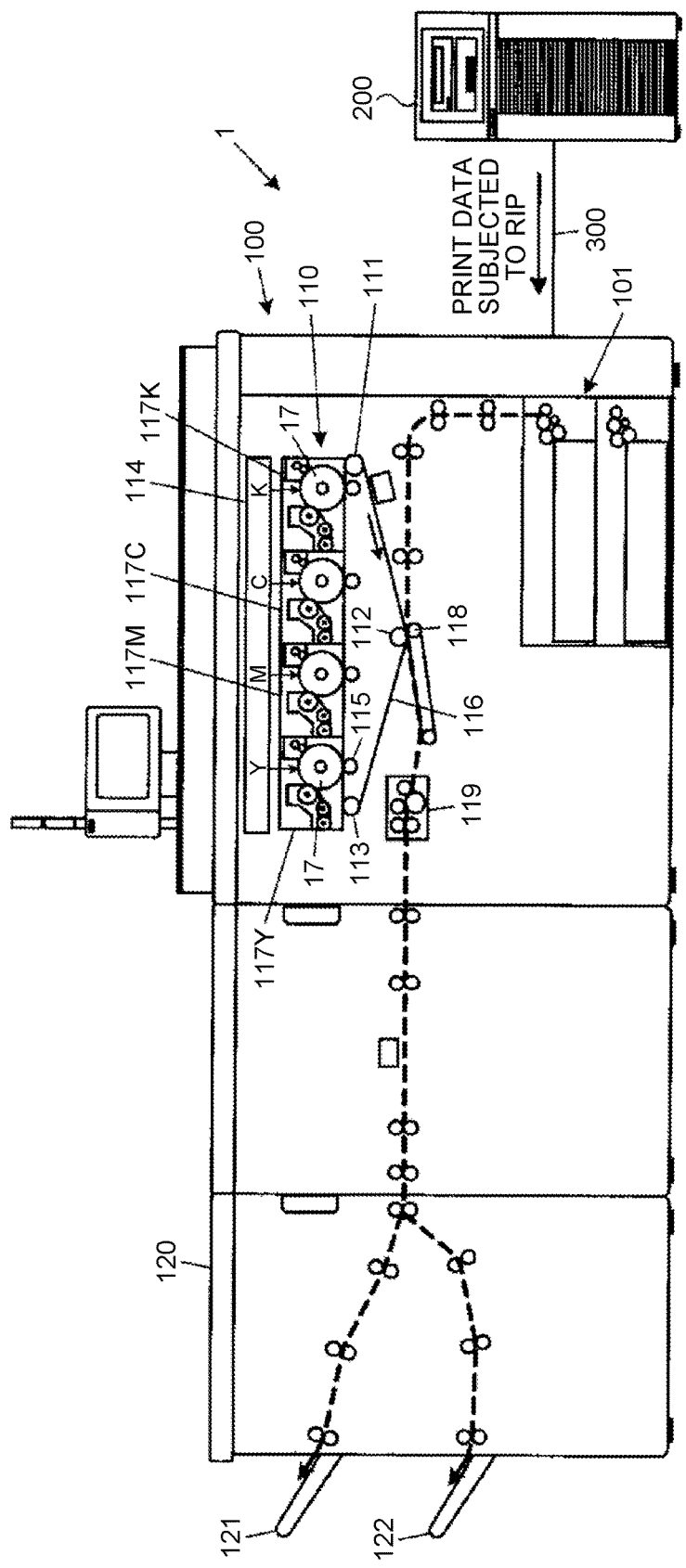
FIG. 1 is a schematic diagram illustrating a configuration of an image processing system according to an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

The present invention has an object to utilize a transmission band more effectively while keeping a transmission speed when data having a plurality of planes is transmitted. The terminology "transmission" that is used in this specification encompasses not only narrow-sense transmission of transmitting information (data), signals, and the like between apparatuses while converting forms thereof but also transmission of transmitting (referred to as "transferring" in general) them without converting the forms thereof.

Hereinafter, embodiments of the present invention will be described with reference to the accompanying drawings.

FIG. 1 is a diagram illustrating a configuration of an image processing system according to an embodiment of the present invention.

An image processing system 1 illustrated in FIG. 1 is an image forming system including an image forming apparatus 100 and a print server 200 that are connected to each other with a communication line 300.

The print server 200 has functions of receiving an instruction to cause the image forming apparatus 100 to execute printing from a user or another apparatus, generating data of a print job that the image forming apparatus 100 is caused to execute in accordance with the instruction, and transmitting the data to the image forming apparatus 100. The print server 200 corresponds to an embodiment of an image data transmission apparatus according to the present invention. The apparatus having the above-described functions is also called a digital front end (DFE) in a field of production printing.

The print job that the print server 200 generates and transmits contains settings (a sheet size, a sheet type, the number of print copies, one-side/double-side printing, and the like) for printing and pieces of image data of pages of a document to be printed. The print server 200 receives the settings for printing together with the printing execution instruction from the user or another apparatus. The pieces of image data are pieces of bitmap data generated by performing print data development processing (raster image processing (RIP)) after image processing is performed on pieces of data of the document that has been instructed to be printed based on the received settings.

The print server 200 transmits the above-described print job to the image forming apparatus 100 through the communication line 300. The communication line 300 is configured using a high-speed serial interface (I/F) with a plurality of lanes. For example, an I/F of a peripheral component interconnect (PCI) Express standard or a V-by-One (registered trademark) standard can be used.

Image data occupies most of the print job that the print server 200 transmits in terms of a data size. The configuration for transmitting the image data at high speed by utilizing the I/F with the lanes efficiently is one of the characteristic points in this embodiment. This point will be described in detail later.

The image forming apparatus 100 is an apparatus that forms an image on a recording medium such as a sheet in accordance with the print job transferred from the print server 200. An image forming unit 110 of the image forming apparatus 100 includes an intermediate transfer belt 116 wound around a driving roller 111, a secondary transfer backup roller 112, and a driven roller 113. The image forming unit 110 further includes cartridges 117Y, 117M, 117C, and 117K of respective colors of yellow (Y), magenta (M), cyan (C), and black (K) that are arranged so as to face the intermediate transfer belt 116.

The cartridges 117Y to 117K include respective photoconductor drums 17 on which toner images of different colors are formed. Each of the cartridges 117Y to 117K includes a charging roller. Voltage applied to the charging roller is applied to the surface of the photoconductor drum 17, and the surface is charged to a predetermined polarity. The charged surface of the photoconductor drum 17 is irradiated with laser beams that are emitted from an optical writing device 114 and are controlled to be turned ON or OFF based on the image data of the corresponding color, and an electrostatic latent image based on the image data of the corresponding color is formed on the surface. The cartridges 117Y to 117K cause toners to adhere to respective electrostatic latent images formed on the surfaces of the respective photoconductor drums 17, thereby forming toner images. The toner images formed on the surfaces of the photoconductor drums 17 are primarily transferred onto the intermediate transfer belt 116 in a superimposed manner when voltage is applied to primary transfer rollers 115 at the opposite side to the photoconductor drums 17 with the intermediate transfer belt 116 interposed therebetween.

A print sheet is conveyed from a sheet feeding device 101 to between the intermediate transfer belt 116 wound around the secondary transfer backup roller 112 and a secondary transfer roller 118 arranged so as to face the secondary transfer backup roller 112. Predetermined voltage is applied to the secondary transfer roller 118 and the toner images of four colors of YCMK on the intermediate transfer belt 116 are secondarily transferred onto the print sheet. The print sheet onto which the toner images have been secondarily transferred passes through a fixing device 119 and the toner images on the print sheet are fixed as an image by heat and pressure. Then, the print sheet is conveyed to a paper ejection device 120.

The paper ejection device 120 is a device that selectively ejects the sheet onto which the image has been fixed to a paper ejection tray 121 or 122.

Figure 2:
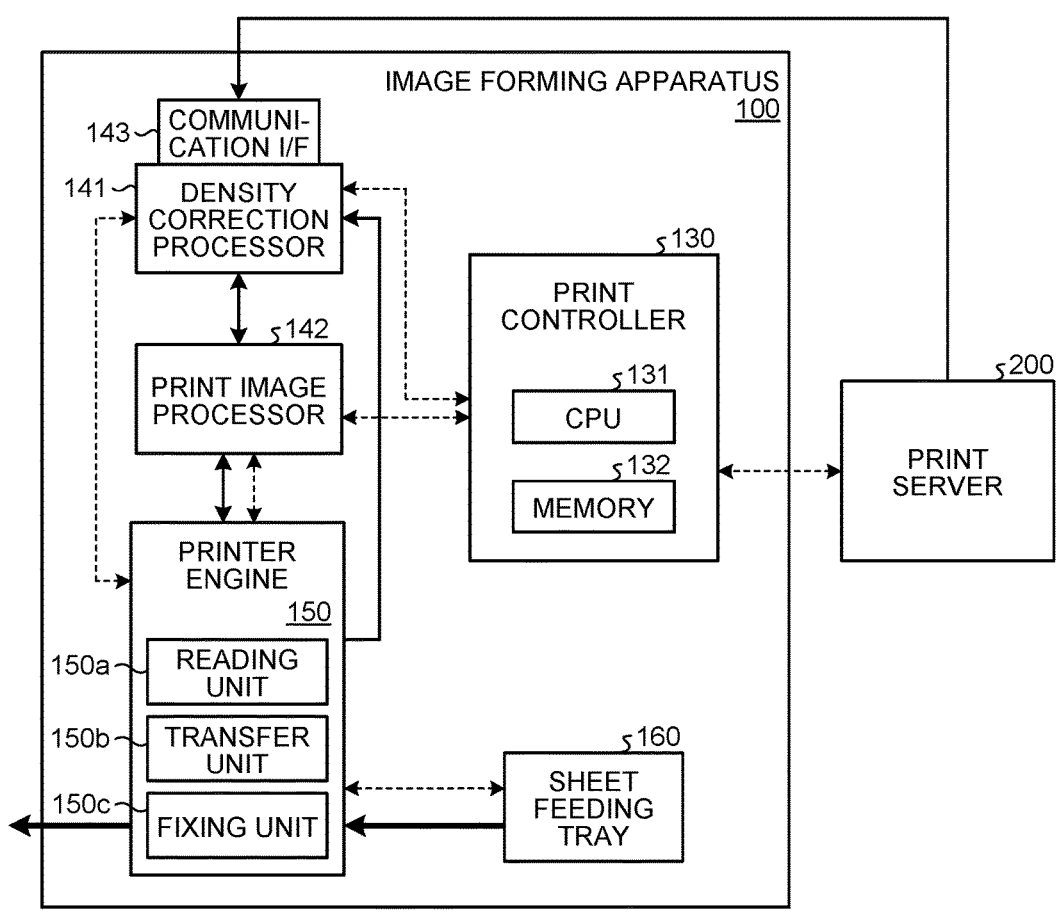
FIG. 2 is a block diagram illustrating a functional configuration of an image forming apparatus illustrated in FIG. 1.

Next, FIG. 2 illustrates a functional configuration of the image forming apparatus 100. In FIG. 2, arrows with solid lines (excluding bold lines) indicate transmission paths of image data, arrows with dashed lines indicate transmission paths of control signals, and arrows with the bold lines indicate conveyance paths of the sheet.

As illustrated in FIG. 2, the image forming apparatus 100 includes a print controller 130, a density correction processor 141, a print image processor 142, a printer engine 150, and a sheet feeding tray 160.

Among them, the print controller 130 includes a central processing unit (CPU) 131 and a memory 132, and has a function of controlling overall printing that the image forming apparatus 100 executes by causing the CPU 131 to execute computer programs stored in the memory 132. The memory 132 can also be used for storing therein control information and the like received from the print server 200.

The density correction processor 141 has functions of receiving the image data subjected to the development processing from the print server 200 through a communication I/F 143 and performing density correction processing appropriate for a current state of the image forming apparatus 100 based on a density measured value. Furthermore, the density correction processor 141 has a function of transferring the image data after the correction to the print image processor 142.

The print image processor 142 receives the image data from the density correction processor 141 and generates pieces of data for controlling laser beams for the respective colors from the optical writing device 114 based on the image data.

The printer engine 150 includes a reading unit 150a, a transfer unit 150b, and a fixing unit 150c and has a function of performing image forming processing on the print sheet.

The sheet feeding tray 160 is a device that feeds the print sheet onto a sheet conveyance path and is controlled by the printer engine 150.

As illustrated in FIG. 2, the image forming apparatus 100 and the print server 200 are connected with the control line (dashed line) and the data line (solid line).

The control line is connected to the print controller 130 and the CPU 131 of the print controller 130 analyzes the control information containing the print settings transmitted from the print server 200. The print controller 130 issues various instructions involved in a print operation to individual blocks in the image forming apparatus 100 based on the analyzed control information. On the other hand, the data line is connected to the density correction processor 141 with the communication I/F 143 and is used for transferring the image data.

The control line and the data line correspond to the communication line 300 illustrated in FIG. 1.

Figure 3:
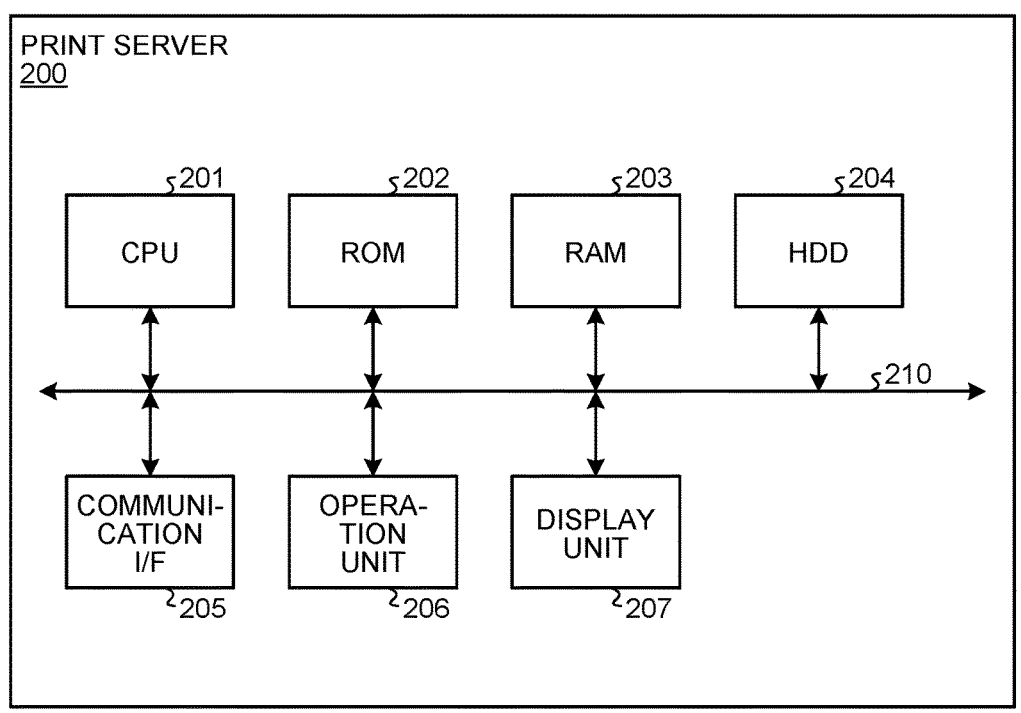
FIG. 3 is a block diagram illustrating a hardware configuration of a print server illustrated in FIG. 1.

Next, FIG. 3 illustrates a hardware configuration of the print server 200.

As illustrated in FIG. 3, the print server 200 includes a CPU 201, a read only memory (ROM) 202, a random access memory (RAM) 203, a hard disk drive (HDD) 204, a communication interface (I/F) 205, an operation unit 206, and a display unit 207 that are connected to one another with a system bus 210.

The CPU 201 executes computer programs stored in the ROM 202 or the HDD 204 by using the RAM 203 as a work area so as to control the overall print server 200 and execute various functions including a function related to transfer control of the image data, which will be described later.

The ROM 202 and the HDD 204 are non-volatile storage media (storage units) and store therein computer programs of various types that the CPU 201 executes and pieces of data of various types necessary for processing.

The RAM 203 functions as the above-described work area and is also a storage unit that is used as an image memory storing therein the image data to be transmitted to the image forming apparatus 100 and be printed and output.

The communication I/F 205 is an interface for making communication with other apparatuses such as the image forming apparatus 100. The communication I/F 205 includes at least an interface for connecting the print server 200 to the image forming apparatus 100 with the above-described control line and data line. In addition, the communication I/F 205 may include interfaces for connecting the print server 200 to other apparatuses.

The operation unit 206 is an operation unit for receiving operations from the user and can include keys of various types, buttons, a touch panel, or the like.

The display unit 207 is a notification unit for notifying the user of operation states and setting contents of the print server 200, messages, and the like, and includes a liquid crystal display and a lamp, for example.

It should be noted that the operation unit 206 and the display unit 207 may be externally mounted. The operation unit 206 and the display unit 207 may not be provided when the print server 200 does not need to directly receive operations from the user (when it is sufficient that the print server 200 receives operations from and provides information to an external apparatus connected to the print server 200 through the communication I/F 205).

Figure 4:
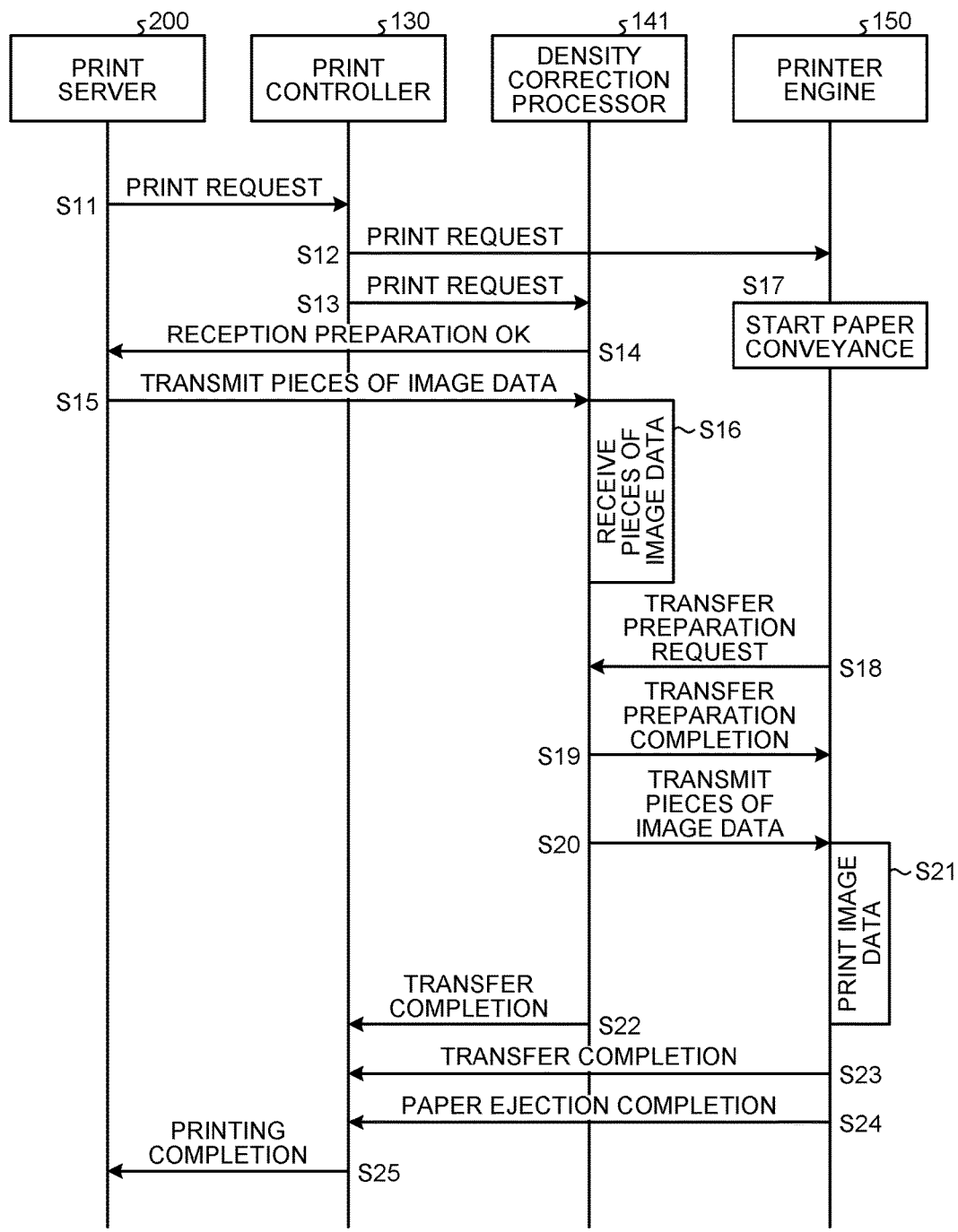
FIG. 4 is a sequence diagram illustrating a flow of operations of individual units when the image forming apparatus is caused to execute printing in accordance with a print job transmitted from the print server in the image processing system illustrated in FIG. 1.

FIG. 4 illustrates a flow of operations of the units illustrated in FIG. 2 when the image forming apparatus 100 is caused to execute printing in accordance with a print job transmitted from the print server 200 in the image processing system 1 as described above.

First, when the print server 200 receives an instruction to cause the image forming apparatus 100 to execute printing from the user or another apparatus, the print server 200 notifies the print controller 130 of the image forming apparatus 100 of a print request through the control line (S11). In this case, the print server 200 also transmits information on the settings for printing to the print controller 130.

The print controller 130 that has received the print request transmits the print request to the density correction processor 141 and the printer engine 150 (S12 and S13).

The density correction processor 141 that has received the print request receives the image data from the print server 200 through the data line. To be more specific, when the density correction processor 141 is ready to receive the image data, it notifies the print server 200 of the readiness (S14). The print server 200 transmits the pieces of image data of four colors of YCMK to the density correction processor 141 upon reception of the notification (S15). The print server 200 transmits the pieces of image data through the communication I/F 205 in the print server 200 and the communication I/F 143 in the image forming apparatus 100. The transmission of the pieces of image data takes some time and the density correction processor 141 keeps receiving the pieces of image data during the transmission (S16).

When the printer engine 150 receives the print request at step S12, it starts sheet conveyance for printing in accordance with print conditions such as the sheet size that have been received together with the print request (S17). When the print sheet is conveyed to a predetermined position, the printer engine 150 notifies the density correction processor 141 of a transfer preparation request (S18). When the density correction processor 141 that has received the transfer preparation request has completely received the pieces of data of a corresponding page, it notifies the printer engine 150 of transfer preparation completion (S19).

Thereafter, the density correction processor 141 transfers the pieces of image data to the printer engine 150 in time with sheet conveyance (S20) and the printer engine 150 executes printing based on the transferred pieces of data (S21). In this case, the density correction processor 141 performs density correction and transfers the pieces of data through the print image processor 142 so that the pieces of data reach the printer engine 150 to serve as pieces of data for controlling the laser beams.

When the density correction processor 141 completely transfers the pieces of data of one page, the density correction processor 141 and the printer engine 150 notify the print controller 130 of the transfer completion (S22 and S23). After the printer engine 150 completes a paper ejection operation, it notifies the print controller 130 of the paper ejection completion (S24). The print controller 130 that has received the notification of the paper ejection completion notifies the print server 200 of completion of printing for one page (S25). With these operations, a printing operation of one page is completed.

When a plurality of pages are printed, the units of the image forming apparatus 100 repeat the operations from step S12 to S25 for each page.

One of the characteristic points in this embodiment is a usage mode and a transmission control mode of a transmission path used to transmit the pieces of image data from the print server 200 to the image forming apparatus 100. Hereinafter, this point will be described in detail. The transmission of the pieces of image data, which will be described below, is transmission related to an embodiment of a transmission method according to the present invention.

Figure 5:
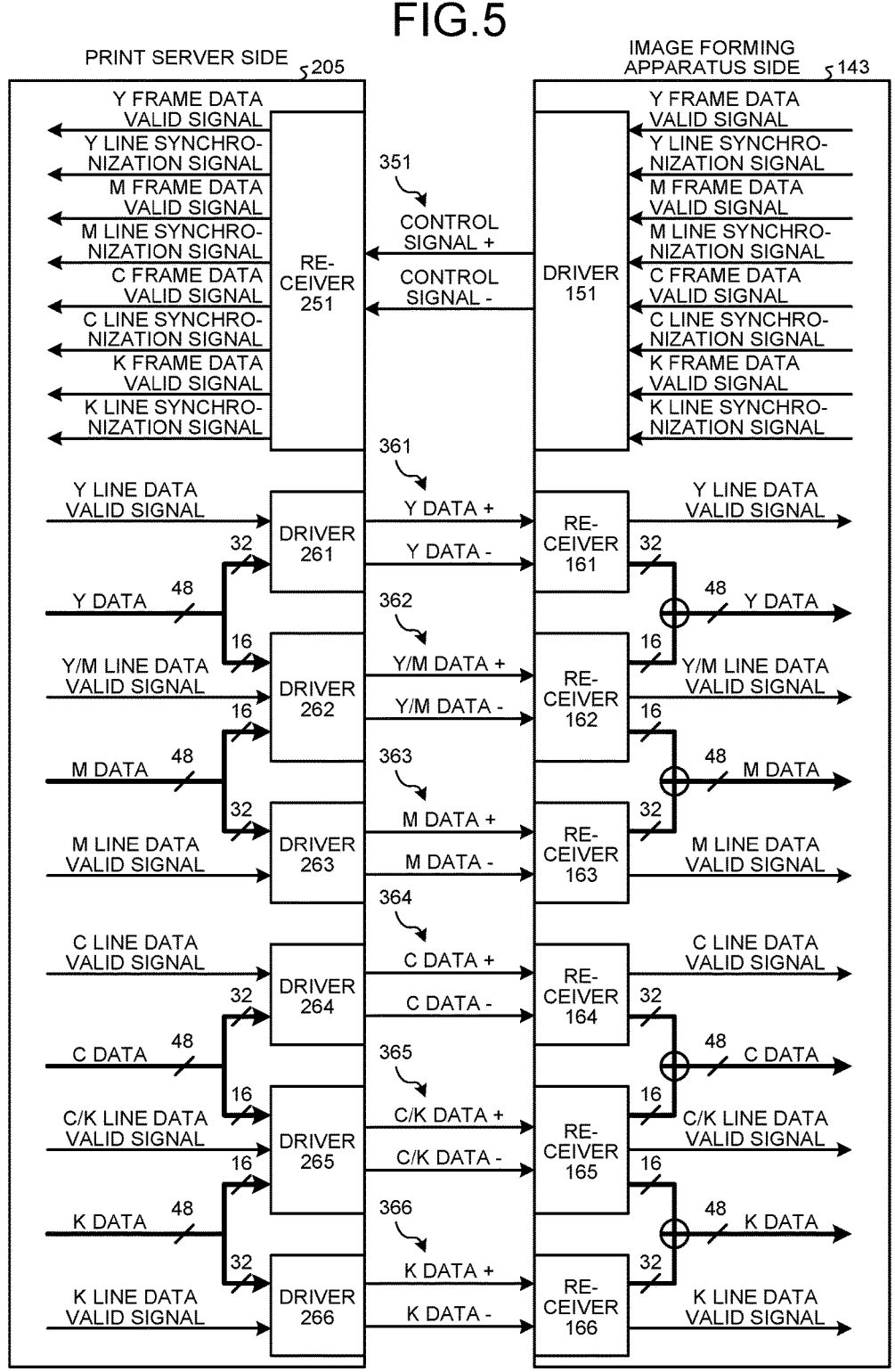
FIG. 5 is a block diagram illustrating functional configurations of communication interfaces (I/Fs) involved in transmission of pieces of image data in the print server and the image forming apparatus.

First, FIG. 5 illustrates functional configurations of the communication I/Fs involved in the transmission of the pieces of image data in the print server 200 and the image forming apparatus 100. It should be noted that FIG. 5 illustrates only functions related to the transmission of the pieces of image data among the functions of the communication I/Fs and the communication I/Fs may further have other functions.

As illustrated in FIG. 5, the communication I/F 143 of the image forming apparatus 100 includes a driver 151 and receivers 161 to 166. The communication I/F 205 of the print server 200 includes a receiver 251 and drivers 261 to 266 corresponding to the respective driver and receivers of the communication I/F 143.

Among them, the drivers 261 to 266 and the receivers 161 to 166 are respectively connected with signal lines 361 to 366 serving as high-speed serial buses each having one lane. The signal line of each lane has two systems of "+" and "−" because a method identifying "0" or "1" of data based on whether a voltage of "+" or a voltage of "−" is higher is employed.

A signal line 351 for transmitting digital control signals of eight types is provided between the driver 151 and the receiver 251. A serial bus is used as the signal line 351 in order to reduce the number of signal lines. Moreover, the serial bus of the same standard as that of the signal lines 361 to 366 is used so as to avoid mixing of serial buses of a plurality of types.

A bus of the V-by-One system having a transfer rate of 3.1 gigabits per second (Gbps) per lane is employed as the serial bus of each lane. In order to set an operation speed of a hardware logic at the data supply side to equal to or lower than substantially 100 megahertz (MHz), pieces of transmission data are supplied to the drivers 261 to 266 with parallel buses of 32 bits. The drivers 261 to 266 are image data transmission units that output the pieces of image data supplied through the parallel buses to the high-speed serial buses in a time division manner. In particular, the drivers 262 and 265 deliver the pieces of image data of a plurality of planes to common transmission lines that are used for transmitting the pieces of image data of the planes.

The receivers 161 to 166 receive the pieces of data that are transmitted through the high-speed serial buses and deliver the received pieces of data to output buses configured as parallel buses of 32 bits for the same reason as that at the driver side.

The driver 151 outputs signal values that are input through signal lines to the high-speed serial bus in a time division manner. The receiver 251 receives the signal values that are transmitted through the high-speed serial bus and outputs them to signal lines corresponding to the respective signal lines at the input side.

Line data valid signals indicating timings at which pieces of valid image data are supplied are supplied to the drivers 261 to 266. In a period during which the line data valid signals are asserted, the pieces of valid image data are supplied to the drivers 261 to 266 and are delivered to the high-speed serial buses.

The drivers 261 to 266 transmit the line data valid signals together with the pieces of image data to the receivers 161 to 166, respectively. The receivers 161 to 166 supply, as the pieces of valid image data, the pieces of data received in the periods during which the line data valid signals are asserted to a processor (the density correction processor 141 in this example) at a subsequent stage. The receivers 162 and 165 that are used as common lanes perform processing specific to the common lanes although they are the same in basic concept. This point will be described later.

It is assumed that a data transfer rate required for transmission (transfer) of the image data of each color (planes are assumed to be distinguished by colors in this example) is 3.6

Gbps. The transfer rate of the V-by-One system is 3.1 Gbps per lane. When thought simply for each color, two lanes are necessary for each color to transfer the image data of each color at 3.6 Gbps. That is to say, eight lanes are necessary for the entire image data of four colors. The same holds true for the case where, for example, the PCI Express Gen1 system the transfer rate of which is 2.5 Gbps per lane is employed as another system.

Requiring the transfer rate of 3.6 Gbps for each color means that a band of 7.2 Gbps is required for two colors. The band of 7.2 Gbps can be provided by three lanes in either the V-by-One system or the PCI Express system.

In this embodiment, the signal line 362 is used as a common transmission line for transmitting the pieces of image data of a plurality of colors (planes) of Y and M. The signal line 362 and the signal lines 361(Y) and 363(M) that are used as exclusive transmission lines each transmitting the image data of one plane enable the pieces of image data of two colors of Y and M to be transmitted using the high-speed serial buses of three lanes. In the same manner, the signal line 365 is used as a common transmission line for transmitting the pieces of image data of a plurality of colors (planes) of C and K. The signal line 365 and the signal lines 364(C) and 366(K) that are used as exclusive transmission lines enable the pieces of image data of two colors of C and K to be transmitted using the high-speed serial buses of three lanes.

As described above, the pieces of image data of four colors are transmitted using the high-speed serial buses of six lanes while keeping a desired transfer rate, thereby utilizing a transmission band more efficiently.

The following Table 1 indicates signals that are transmitted and received between the communication I/F 143 and the communication I/F 205 illustrated in FIG. 5. The leading alphabets of the respective signal names express colors of the pieces of image data to which the signals are related. "Y/M" and "C/K" express that the signals are related to the common transmission lines of the respective colors.

TABLE 1

| Signal type | Color type | Direction | Signal name |
| --- | --- | --- | --- |
| Control signal | Y | Image forming apparatus → Print server | Y frame data valid signal |
| | | Image forming apparatus → Print server | Y line synchronization signal |
| | | Print server → Image forming apparatus | Y line data valid signal |
| | Y/M | Print server → Image forming apparatus | Y/M line data valid signal |
| | M | Image forming apparatus → Print server | M frame data valid signal |
| | | Image forming apparatus → Print server | M line synchronization signal |
| | | Print server → Image forming apparatus | M line data valid signal |
| | C | Image forming apparatus → Print server | C frame data valid signal |
| | | Image forming apparatus → Print server | C line synchronization signal |
| | | Print server → Image forming apparatus | C line data valid signal |
| | C/K | Print server → Image forming apparatus | C/K line data valid signal |

TABLE 1-continued

| Signal type | Color type | Direction | Signal name |
| --- | --- | --- | --- |
| | K | Image forming apparatus → Print server | K rame data valid signal |
| | | Image forming apparatus → Print server | K line synchronization signal |
| | | Print server → Image forming apparatus | K line data valid signal |
| Data signal | Y | Print server → Image forming apparatus | Y data [31:0] |
| | Y/M | Print server → Image forming apparatus | Y/M data [47:32] |
| | M | Print server → Image forming apparatus | M data [31:0] |
| | C | Print server → Image forming apparatus | C data [31:0] |
| | C/K | Print server → Image forming apparatus | C/K data [47:32] |
| | K | Print server → Image forming apparatus | K data [31:0] |

Among these signals, the data signals are signals for transmitting the pieces of image data and are generated based on the pieces of transmission image data that are supplied to the drivers 261 to 266 through the parallel buses of 32 bits. In each common transmission line, ranges of the transmission band of the serial bus that are used for transmitting the pieces of image data of the respective colors are preferably defined in order to transmit the image data of each color for 16 bits. Although the definition is not essential, it facilitates transmission control.

Direct memory access controllers (DMAC) (see FIG. 6) 271 included in the communication I/F 205 read the pieces of image data of the respective colors and output them to the buses of 48 bits that is the sum of 32 bits and 16 bits described above. The communication I/F 205 divides the image data of each color into a first part of 32 bits and a second part of 16 bits and transmits the former part with corresponding one of the exclusive transmission lines and the latter part with corresponding one of the common transmission lines. Thus, the pieces of image data of each color are supplied to the exclusive transmission line and the common transmission line at the same timing.

The communication I/F 205 serving as the image data transmission unit divides the image data of one plane into the first part that is transmitted with the exclusive transmission line and the second part that is transmitted with the common transmission line. Then, the communication I/F 205 delivers the first part to the exclusive transmission line and the second part to the common transmission line simultaneously in accordance with one synchronization signal from a transmission target apparatus of the image data.

The communication I/F 143 in the image forming apparatus 100 restores the pieces of image data of 32 bits and 16 bits from the data signals received by the receivers and supplies them to the density correction processor 141 using the buses of 48 bits.

The division into 32 bits and 16 bits may not be simple division into high-order bits and low-order bits as long as the pieces of image data can be restored later.

A bus size of 48 bits is defined based on a transfer speed of the serial bus and an operation speed of a hardware logic at the data reception side as in the case of the print server 200.

The frame data valid signals in the control signals are signals for the image forming apparatus 100 to notify the print server 200 of whether the image forming apparatus 100 is ready to receive pieces of image data of the respective colors. In a period during which the frame data valid signals are asserted, the image forming apparatus 100 is ready to receive the pieces of image data. The image forming apparatus 100 is ready to receive the pieces of image data and asserts the frame data valid signals, and then, completely receives the pieces of image data for one page. Thereafter, the image forming apparatus 100 once negates the frame data valid signals. Then, when the image forming apparatus 100 is ready to receive pieces of image data of a subsequent page, it asserts the signals again.

The asserting timing is defined in accordance with the progress of a printing process. As illustrated in FIG. 1, an image writing position differs among the colors and a writing timing therefore differs there among. With this difference, the timing at which the frame data valid signal is asserted also differs among the colors. The timings at which the frame data valid signals are asserted are determined for the respective colors and no frame data valid signal corresponding to the common transmission lines is used.

The line synchronization signals are signals for the image forming apparatus 100 to notify the print server 200 of whether the image forming apparatus 100 is ready to receive the pieces of image data of the respective colors. Asserted pulses indicate that the image forming apparatus 100 is ready to receive the pieces of image data. The image forming apparatus 100 asserts the respective line synchronization signals every certain period of time while the frame data valid signals are asserted. No line synchronization signal corresponding to the common transmission lines is used as in the case of the frame data valid signals.

The line data valid signals are signals for the print server 200 to notify the image forming apparatus 100 of timings at which the pieces of valid image data are transmitted to the transmission lines for the respective planes. In a period during which the line data valid signals are asserted, the pieces of valid image data are transmitted. In the print server 200, when the DMACs included in the communication I/F 205 detect that the line synchronization signals are asserted for the colors of YMCK, the DMACs read the pieces of image data for one line from the image memory storing therein pieces of image data to be transferred to the image forming apparatus 100.

Then, the DMACs assert the line data valid signals of the respective colors after the reading and supply the pieces of read image data to the drivers that are used for transferring the pieces of image data. When the DMACs finish the supply of the pieces of image data for one line, they negate the line data valid signals.

The line data valid signals that can be thus generated are line data valid signals (first timing signals) for the exclusive transmission lines, and circuits that generate the signals (although the circuits are DMACs in this example, other circuits may have the same function) correspond to a first signal generation unit.

It should be noted that the line data valid signals corresponding to the common transmission lines are also needed. The line data valid signals corresponding to the common transmission lines can be generated based on the line data valid signals for the colors that are transmitted through the common transmission lines.

For example, as for the common transmission line of Y and M, the image data of Y for 16 bits is transmitted therethrough in a period during which the Y line data valid signal is asserted and the image data of M for 16 bits is transmitted therethrough in a period during which the M line data valid signal is asserted.

That is to say, valid image data is transmitted using the common transmission line of Y and M in a period during which at least one of the Y line data valid signal and the M line data valid signal is asserted. Thus, the Y/M line data valid signal for the common transmission line can be provided by implementing a logical addition (OR) operation of the Y line data valid signal and the M line data valid signal. The same holds true for the C/K line data valid signal.

A circuit that generates the line data valid signal (second timing signal) for the common transmission line corresponds to a second signal generation unit.

Next, a method and a circuit for transferring the pieces of image data using the common transmission lines illustrated in FIG. 5 will be described more in detail with reference to FIG. 6 and FIG. 7. Although FIG. 6 and FIG. 7 illustrate configurations of the common transmission line of Y and M, the pieces of image data can also be transferred using the common transmission line of C and K in the same manner.

Figure 6:
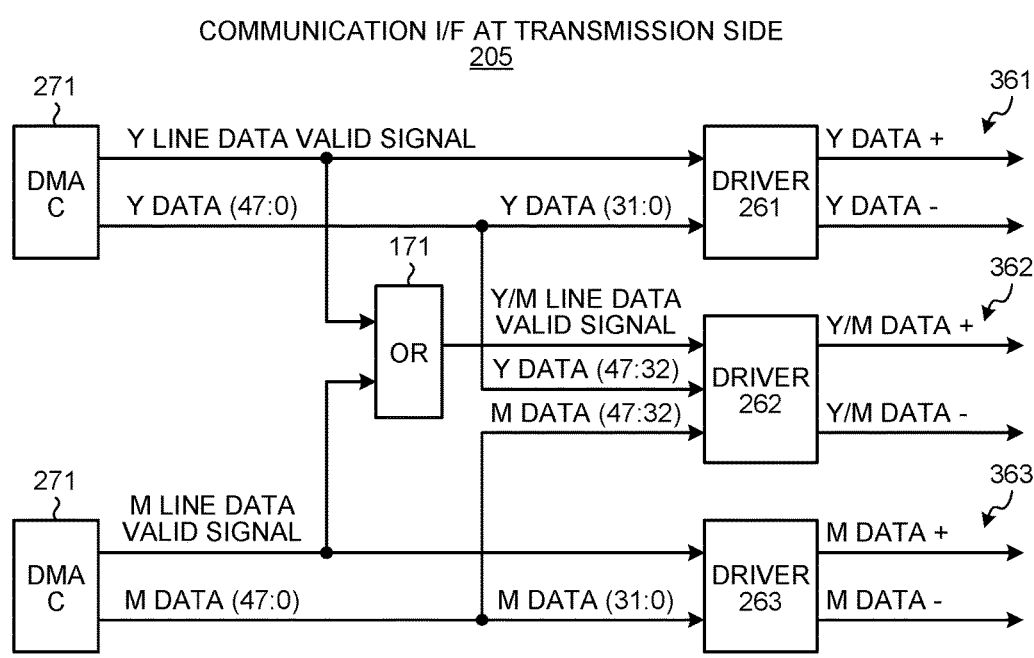
FIG. 6 is a block diagram illustrating a configuration of a circuit for transmitting pieces of image data of Y and M in the communication I/F at the transmission side.
Figure 7:
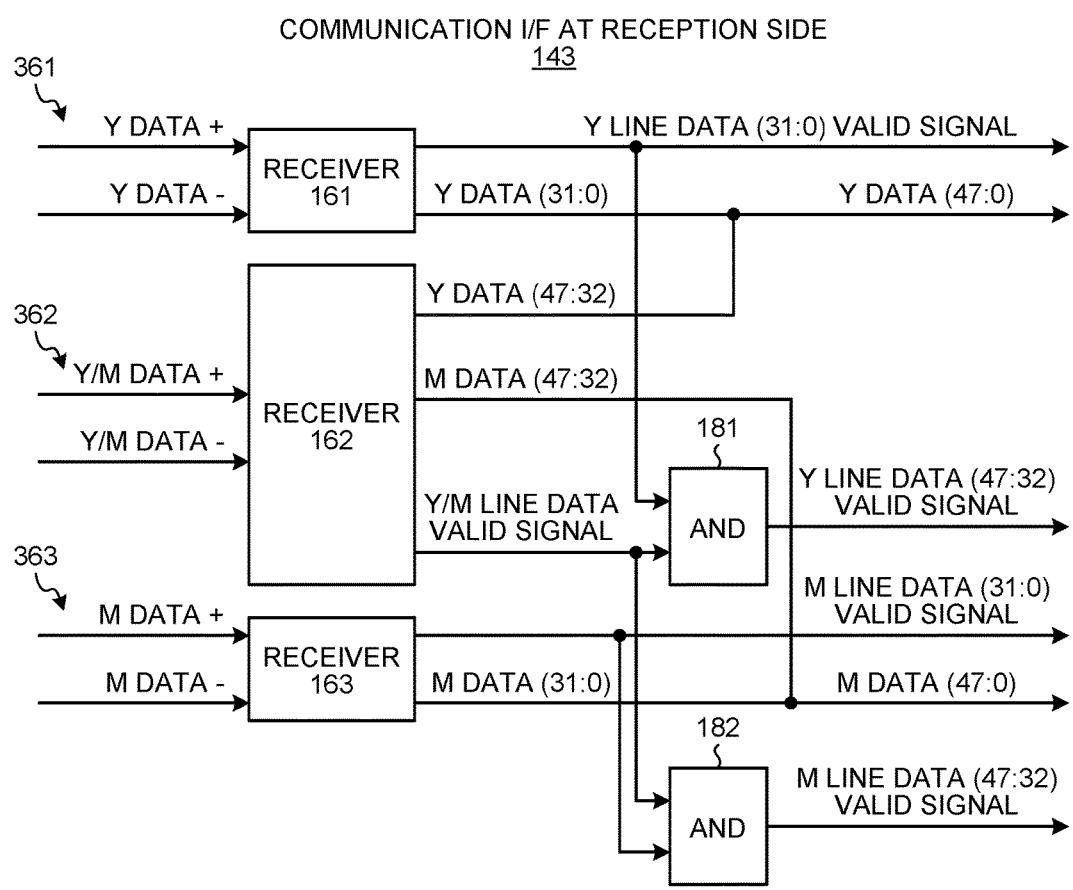
FIG. 7 is a block diagram illustrating a configuration of a circuit for receiving the pieces of image data of Y and M in the communication I/F at the reception side.

First, FIG. 6 illustrates a configuration of the circuit for transmitting the pieces of image data of Y and M in the communication I/F 205 at the transmission side.

As described above, the image data of each color is supplied with the bus of 48 bits (47:0). The communication I/F 205 illustrated in FIG. 3 divides the image data of each color into low-order 32 bits (31:0) and high-order 16 bits (47:32) and inputs the former to the driver for the exclusive transmission line (the driver 261 for Y and the driver 263 for M). The communication I/F 205 inputs the latter to the driver 262 for the common transmission line. The driver 262 transmits the image data of Y using the half of the band of the high-speed serial bus and transmits the image data of M using the other half thereof.

In the communication I/F 205, when the communication I/F 143 illustrated in FIG. 2 transmits the Y line synchronization signal, the DMAC 271 that performs processing of Y reads the image data of Y for one line from the image memory. When the DMAC 271 completely reads the image data, it asserts the Y line data valid signal and outputs the image data (Y data) to the bus of 48 bits. In the same manner, when the communication I/F 143 transmits the M line synchronization signal, the DMAC 271 that performs processing of M reads the image data of M for one line from the image memory. When the DMAC 271 completely reads the image data, it asserts the M line data valid signal and outputs the image data (M data) to the bus of 48 bits.

The Y/M line data valid signal for the common transmission line can be generated by implementing the OR operation of the Y line data valid signal and the M line data valid signal as described above. An OR circuit 171 therefore functions as the second signal generation unit and generates the Y/M line data valid signal.

The timings at which the Y line data valid signal and the M line data valid signal are asserted are different from each other. That is to say, the pieces of valid image data are not necessarily transmitted with all the bits of the common transmission line even in a period during which the Y/M line data valid signal is asserted. The communication I/F 143 at the reception side adjusts this point.

FIG. 7 illustrates a configuration of the circuit for receiving the pieces of image data of Y and M in the communication I/F 143 at the reception side.

In the communication I/F 143 illustrated in FIG. 2, the receivers 161 to 163 receive the pieces of image data of Y and M. Furthermore, the receivers 161 to 163 also receive the line data valid signals for the respective transmission lines.

Then, the receiver 161 outputs the image data of Y (Y data (31:0)) received through the exclusive transmission line to the parallel bus of 32 bits. The receiver 162 outputs the image data of Y (Y data (47:32)) received through the common transmission line in the band that is used for transferring the image data of Y to the parallel bus of 16 bits for Y. The communication I/F 143 binds these pieces of image data and outputs the Y data (47:0) to the density correction processor 141 illustrated in FIG. 2 through an output bus that is a parallel bus of 48 bits.

In the same manner, the receiver 163 outputs the image data of M (M data (31:0)) received through the exclusive transmission line to the parallel bus of 32 bits. The receiver 162 outputs the image data of M (M data (47:32)) received through the common transmission line in the band that is used for transferring the image data of M to the parallel bus of 16 bits for M. The communication I/F 143 binds these pieces of image data and outputs the M data (47:0) to the density correction processor 141 illustrated in FIG. 2 through an output bus that is a parallel bus of 48 bits.

The density correction processor 141 illustrated in FIG. 2 stores the pieces of image data that are supplied from the communication I/F 143 in an internal buffer of a processing circuit such as an application specific integrated circuit (ASIC) or a field-programmable gate array (FPGA) for the respective colors. Then, the density correction processor 141 performs the correction processing. Alternatively, the density correction processor 141 may be configured to directly input the pieces of image data that are supplied from the communication I/F 143 to the hardware logic for processing without storing them in the buffer.

The communication I/F 143 outputs the pieces of image data of the respective colors only in the periods during which the line data valid signals of the respective colors are asserted.

For the pieces of image data received through the exclusive transmission lines, the line data valid signals received through the transmission lines can be used as they are. Such a signal is indicated as a "Y line data (31:0) valid signal" in FIG. 7.

A logical conjunction (AND) operation of the Y/M line data valid signal received through the common transmission line and the Y line data valid signal received through the exclusive transmission line is implemented (to generate a signal that is asserted only in a period during which both of the signals are asserted). This AND operation can generate a signal that is asserted only in a period during which the image data of Y is transmitted through the common transmission line. FIG. 7 indicates that an AND circuit 181 generates the above-described signal and the generated signal is a "Y line data (47:32) valid signal".

As described above in the description with reference to FIG. 6, the pieces of image data of each color are delivered to the exclusive transmission line and the common transmission line simultaneously. High-speed serial buses of V-by-One or the like embed clock signals in the pieces of data, and the pieces of output data from the receivers therefore operate based on the clock signals with phases that technically differ among lanes. Thus, the data transfer timings technically differ among lanes, and a line data valid signal is necessary for each lane.

The same relation as that for Y is established between an "M line data (31:0) valid signal" and an "M line data (47:32) valid signal" that an AND circuit 182 generates.

With the above-described configuration, even when the common transmission line is used, the image data for each color can be taken easily.

Figure 8:
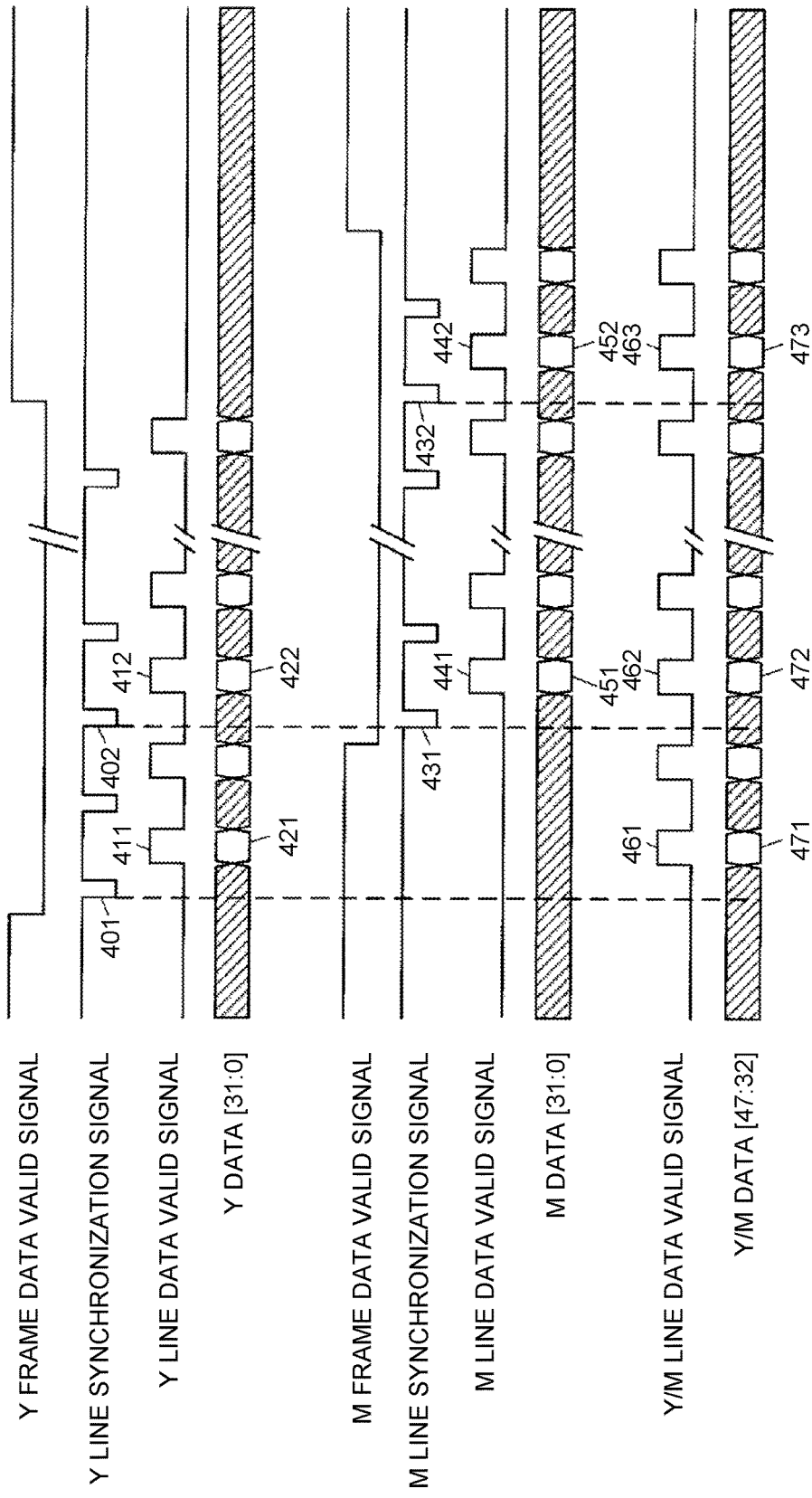
FIG. 8 is a timing chart illustrating a specific example of transmission timings of the pieces of image data by the circuits described with reference to FIG. 5 to FIG. 7.

Next, FIG. 8 illustrates specific examples of the transmission timings of the pieces of image data by the circuits described with reference to FIG. 5 to FIG. 7. Although FIG. 8 illustrates the timings of the signals of various types that are related to transmission of the pieces of image data of Y and M, the pieces of image data of C and K can also be transferred at similar timings. Although the frame data valid signals and the line synchronization signals are low active and the line data valid signals are high active in the examples of FIG. 8, they are not limited to the manners.

FIG. 8 illustrates an example when the image forming apparatus 100 becomes capable of receiving the image data of the Y plane first, and then becomes capable of receiving the image data of the M plane. Reflecting this state, the Y frame data valid signal becomes active first in the example of FIG. 8. That is to say, the image forming apparatus 100 makes the Y frame data valid signal active at a timing at which it needs the image data, and the signal is also transmitted to the print server 200.

The print server 200 prepares transmission of the image data of the Y plane by being triggered by reception of the Y frame data valid signal. Then, when an active pulse 401 is detected in the Y line synchronization signal, the DMAC 271 reads the image data of the Y plane for one line, asserts the Y line data valid signal, and starts transmission of the read image data.

As described above with reference to FIG. 6, the Y/M line data valid signal is also asserted simultaneously with an action by the OR circuit 171. The image data of the Y plane is supplied to an input bus of 48 bits from the image memory, and, from the 48 bits, image data for 32 bits is transmitted from the driver 261 and image data for 16 bits is transmitted from the driver 262. In this case, a band that is used for transmitting the image data of the M plane in the signal line 362 connected to the driver 262 is not used for data transmission. Thus, the driver 262 may output meaningless data such as random data or all zeros as appropriate.

Reference numerals 421 and 471 in FIG. 8 each indicate a period during which the image data for one line is transmitted. Reference numerals 411 and 461 each indicate a period during which the corresponding line data valid signal is asserted.

Thereafter, the print server 200 delivers the image data of the Y plane for one line every time it detects the active pulse of the Y line synchronization signal until the Y frame data valid signal becomes inactive.

Then, when the image forming apparatus 100 becomes capable of receiving the image data of the M plane, the M frame data valid signal becomes active. The print server 200 prepares transmission of the image data of the M plane by being triggered by the activation of the signal. When an active pulse 431 is detected in the M line synchronization signal, the DMAC 271 reads the image data of the M plane for one line, asserts the M line data valid signal, and starts transmission of the read image data. The active pulse 431 in the M line synchronization signal is generated in synchronization with an active pulse 402 of the Y line synchronization signal.

In this case, in the example of FIG. 8, the Y line data valid signal and the M line data valid signal are activated in synchronization with each other (412 and 441). Even if they are not synchronized with each other, the AND circuits 181 and 182 in FIG. 7 can separate the Y line data valid signal (47:32) and the M line data valid signal (47:32), respectively, from the Y/M line data valid signal. That is to say, only image data of a necessary color can be taken from the data that is transmitted through the common transmission line. Thus, the synchronization is not essential.

Reference numerals 422, 451, and 472 in FIG. 8 each indicate a period during which the pieces of image data for one line are transmitted immediately after the M frame data valid signal becomes active. Reference numerals 412, 441, and 462 each indicate a period during which the respective line data valid signals are asserted. In the transmission period 472, the pieces of image data of both of the Y plane and the M plane are transmitted through the signal line 362 connected to the driver 262 illustrated in FIG. 6.

The timing at which the data is completely transferred differs between the Y plane and the M plane because the timing at which the data starts to be transferred differs therebetween. As illustrated in FIG. 8, when transfer of the image data of the Y plane for one page is finished, the Y frame data valid signal becomes inactive (is negated). After that, only the image data of the M plane is delivered at the timing of an active pulse 432 in the M line synchronization signal. In FIG. 8, transmission periods 452 and 473 (assert periods 442 and 463) and subsequent periods correspond to the above described case. Operations in the periods are the same as those in the earlier transmission periods including 421 and 471 except that Y and M are switched.

The above-described embodiment is premised on generation of no skew among lanes. For example, when the individual lanes are physically independent, skew is however generated among the lanes and the pieces of data are not normally transferred, resulting in a problem.

The line synchronization signals are asserted simultaneously in the above-described configuration. The following problem therefore occurs when pieces of image data having different sizes (main scanning widths) among color versions of a plurality of colors are received. That is, for a color version for which an image having a small main scanning width is received, even in a state capable of receiving subsequent line data, reception of the subsequent line data cannot be started before reception of line data of an image having a large main scanning width is completed. For this reason, transfer efficiency lowers.

For avoiding lowering of the transfer efficiency, the following embodiment of the present invention prevents data transfer performance from lowering in any cases by a data transfer system with which line synchronization transfer is performed while a plurality of colors share one lane of the high-speed serial bus. In other words, the following embodiment can prevent the data transfer performance from lowering even when the pieces of image data of a plurality of colors that are transferred by the common lane have different image widths under a condition where skew is present among the lanes.

The line synchronization transfer is performed with one lane of the high-speed serial bus that is shared by the plurality of colors in the following manner.

In the case where the pieces of data having different image widths are received with the common lane, when line data transfer of a certain color is completed, a data transfer controller at the image data transmission side receives the line synchronization signal of a subsequent line even if line data transfer of another color is not completed. Then, the data transfer controller controls a level of the line data valid signal in accordance with the state of the received line synchronization signal to temporarily interrupt and restart data transfer. This mode enables the line synchronization transfer to be performed while making the pieces of data of mixed colors independent in the common lane.

Figure 9:
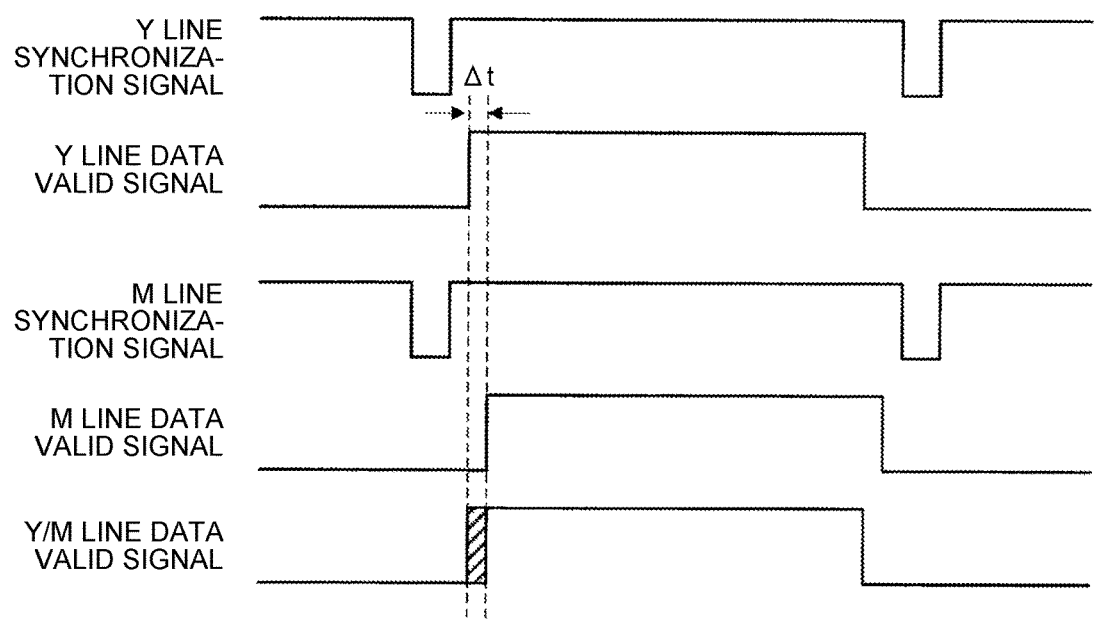
FIG. 9 is a timing chart for explaining an influence when skew is generated among lanes of a high-speed serial I/F.

FIG. 9 is a timing chart for explaining an influence when skew is generated among the lanes of a high-speed serial I/F.

When the print server 200 illustrated in FIG. 3 receives the Y line synchronization signal and the M line synchronization signal from the image forming apparatus 100, it outputs the Y, M, and Y/M line data valid signals to the image forming apparatus 100 simultaneously. Skew is generated among the lanes on paths through which the image forming apparatus 100 receives the line data valid signals in some cases.

FIG. 9 illustrates the case where reception of the line data valid signal through the M lane is delayed than reception of the line data valid signals through the Y lane and the Y/M lane due to generation of skew. The Y/M lane includes the Y data and the M data. With the configuration involving the AND operation of the line data valid signals as illustrated in FIG. 7 in order to determine whether the pieces of data of the individual colors in the Y/M lane are valid, the valid data is missed in some cases.

That is to say, in the shaded portion of the Y/M line data valid signal illustrated in FIG. 9, the Y data and the M data are normally present as pieces of valid data in the Y/M lane. However, because the reception of the M line data valid signal has been delayed by Δt due to the skew, the AND result of the M line data valid signal and the Y/M line data valid signal is "0" and the valid M data is determined to be absent in the shaded portion. Thus, the valid data is missed.

Figure 10:
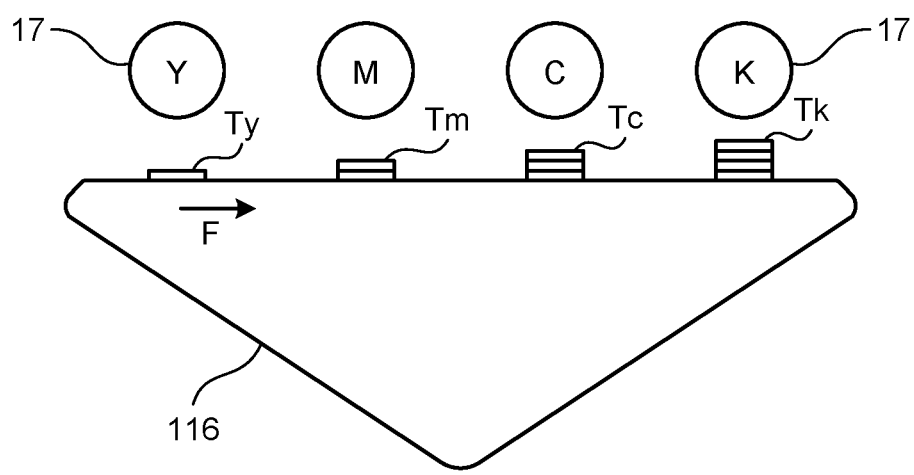
FIG. 10 is a diagram for explaining transfer of toner images of respective colors onto an intermediate transfer belt by photoconductor drums of respective color versions.

FIG. 10 is a diagram for explaining transfer of toner images of the respective colors onto the intermediate transfer belt by the photoconductor drums of the respective color versions.

A state of a received page when the image forming apparatus 100 prints images of a plurality of pages continuously is explained.

The photoconductor drums 17 of the respective color versions in the image forming apparatus 100 are arranged above the intermediate transfer belt 116 with the positions of the photoconductor drums 17 being physically shifted along the movement direction of the intermediate transfer belt 116 (direction of an arrow F), as illustrated in FIG. 10. When an image is printed, toner images Ty, Tm, Tc, and Tk of the respective colors that have been formed on the surfaces of the photoconductor drums 17 of the color versions are transferred in this order onto the surface of the intermediate transfer belt 116 in a superimposed manner. The timing at which the image data starts to be received differs among the colors.

Figure 11:
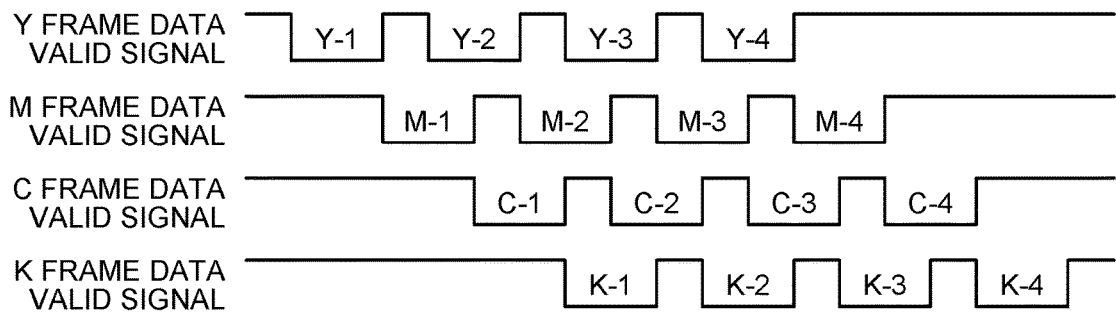
FIG. 11 is a timing chart illustrating example waveforms of frame data valid signals of the respective colors when the image formation order of an image is the order of YMCK.

FIG. 11 is a timing chart illustrating example waveforms of the frame data valid signals of the respective colors when the image formation order of an image is the order of YMCK.

In a first low-level period Y-1 of the Y frame data valid signal illustrated in FIG. 11, image data of the Y version for a first page is received and image formation processing is performed. A toner image of the Y version is thereby formed. By the time when the toner image reaches the photoconductor drum of the M version, in a first low-level period M-1 of the M frame data valid signal, image data of the M version for a first page starts to be received. In this case, in order to print a subsequent page continuously, image data of the Y version for a second page starts to be received in a subsequent low-level period Y-2 of the Y frame data valid signal during the reception of the image data of the M version for the first page.

The Y version and the M version have been explained in the above-described example. For the C version and the K version, the timings at which pages are received are sequentially shifted as illustrated by low-level periods C-1, C-2, and the like and K-1, K-2, and the like of the C frame data valid signal and the K frame data valid signal in FIG. 11 in the same manner.

Figure 12:
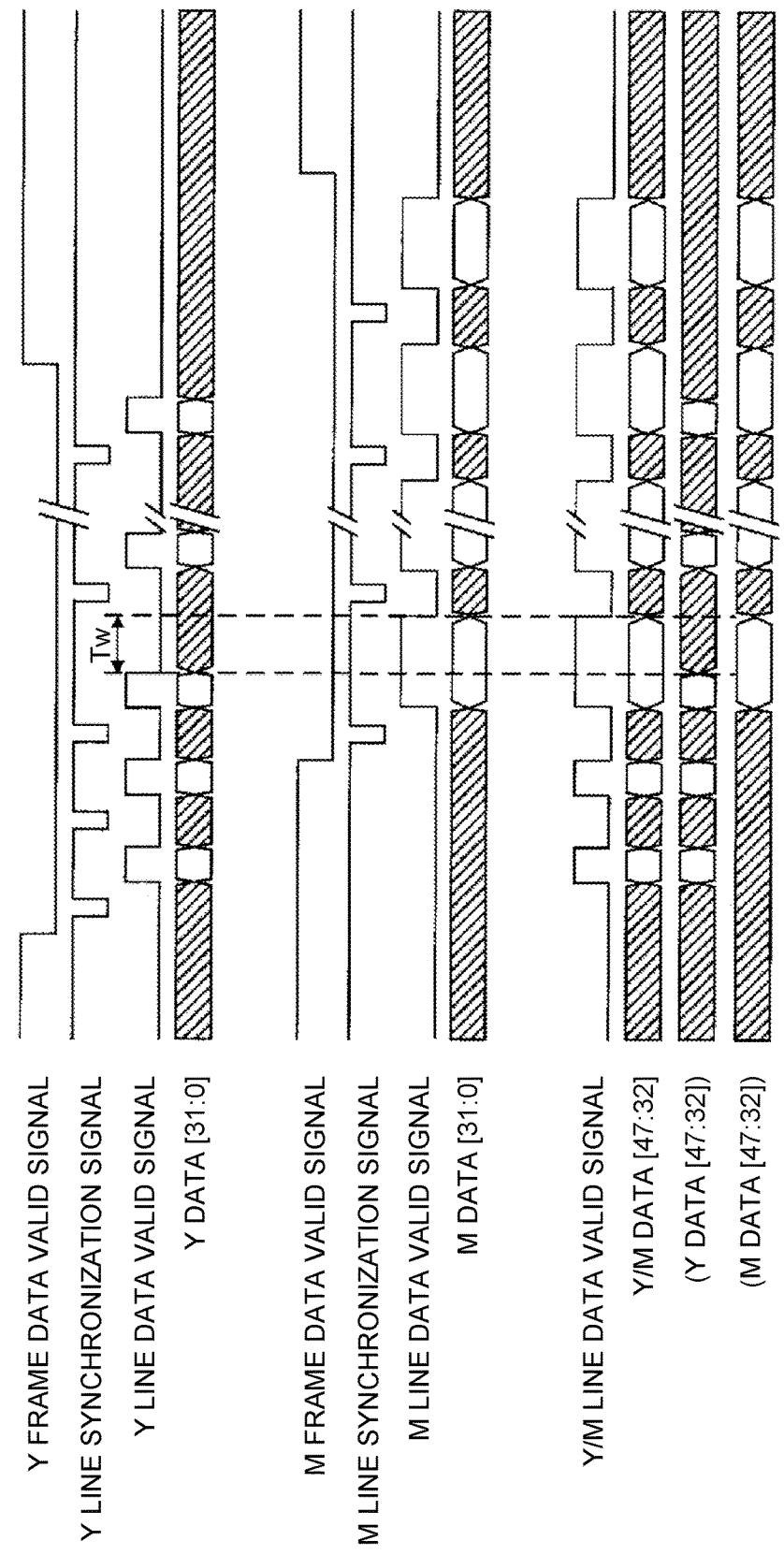
FIG. 12 is a timing chart for explaining operations when images having different main scanning widths are received.

FIG. 12 is a timing chart for explaining operations when images having different main scanning widths are received. That is to say, FIG. 12 illustrates waveforms when pieces of data having different image sizes (main scanning widths) for the respective color versions are received in a state where the received pages are shifted among the color versions as illustrated in FIG. 11. This example indicates the case where the main scanning widths of the images that are being received satisfy a relation of "Y version <M version".

When a system in which the line synchronization signals are output in synchronization with each other is employed, a subsequent line synchronization signal cannot be output before line data having a larger main scanning width is completely received and data transfer waiting time Tw is generated. In other words, as for the Y version, although the line data is completely received and reception of subsequent line data can be started, the waiting time Tw is needed before the line data of the M version is completely received. As a result, the transfer performance lowers.

A system in which the line synchronization signals of the Y version and the M version are output independently enables pieces of data to be received without lowering the transfer performance even when the images to be received have different main scanning widths. Even in this case, when skew is generated among the lanes, the valid data in the Y/M data may be missed as described above with reference to FIG. 9. For this reason, problems such as formation of an abnormal image and action stop occur, resulting in failure of image transfer.

For example, it is assumed that reception of the line data of the Y version is finished first during reception of the line data of the M version. Subsequently, the line synchronization signal of only the Y version is output and reception of data of the Y version is started for a subsequent line. In this case, when reception of the data of the Y version is started for the subsequent line during the reception of the line data of the M version, the Y/M line data valid signal has already been in a valid state with the line data transfer of the M version. When skew is present among the lanes, a timing at which the Y data of the Y/M line data becomes valid cannot be accurately determined even by implementing the AND operation of the Y line data valid signal and the Y/M line data valid signal.

Figure 13:
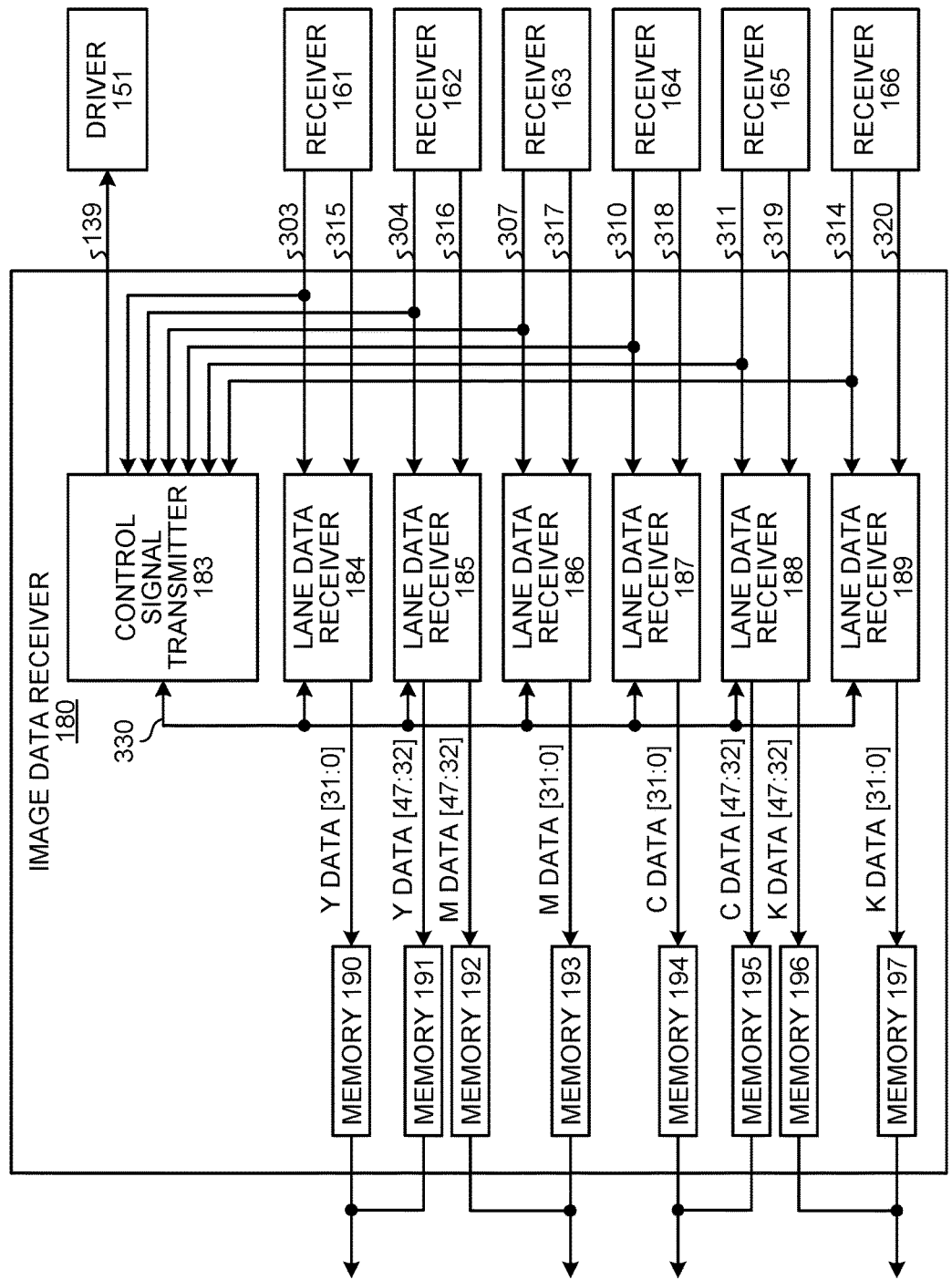
FIG. 13 is a block diagram illustrating an example configuration of an image data receiver in an image processing system according to another embodiment of the invention.

FIG. 13 is a block diagram illustrating an example configuration of an image data receiver in an image processing system according to another embodiment of the present invention.

An image data receiver 180 illustrated in FIG. 13 corresponds to the communication I/F 143 of the image forming apparatus 100 illustrated in FIG. 2. The image data receiver 180 includes a control signal transmitter 183 and lane data receivers 184 to 189.

The control signal transmitter 183 outputs, to the driver 151, the frame data valid signals and the line synchronization signals of the respective colors illustrated in FIG. 5 (that are collectively indicated as a data reception control signal 139 in FIG. 13).

The lane data receivers 184 to 189 receive pieces of data of respective lanes from the receivers 161 to 166, respectively, and write them into respective memories 190 to 197 at subsequent stages.

The lane data receiver 184 receives a Y line data valid signal 303 and Y data [31:0] 315 from the receiver 161 and writes the Y data [31:0] into the memory 190. The lane data receiver 185 receives a Y/M line data valid signal 304 and Y/M data [47:32] 316 from the receiver 162 and writes Y data [47:32] into the memory 191 and writes M data [47:32] into the memory 192.

The lane data receiver 186 receives an M line data valid signal 307 and M data [31:0] 317 from the receiver 163 and writes the M data [31:0] into the memory 193. The lane data receiver 187 receives a C line data valid signal 310 and C data [31:0] 318 from the receiver 164 and writes the C data [31:0] into the memory 194. The lane data receiver 188 receives a C/K line data valid signal 311 and C/K data [47:32] 319 from the receiver 165 and writes C data [47:32] into the memory 195 and writes K data [47:32] into the memory 196.

The lane data receiver 189 receives a K line data valid signal 314 and K data [31:0] 320 from the receiver 166 and writes the K data [31:0] into the memory 197.

A control line 330 for transmitting and receiving states of the frame data valid signals and reception states of the pieces of line data to and from the control signal transmitter 183 is connected to the lane data receivers 184 to 189.

The line data valid signals 303, 304, 307, 310, 311, and 314 of Y, Y/M, M, C, C/K, and K that are output from the receivers 161 to 166 of the respective lanes are input to the control signal transmitter 183 in addition to the control line 330. The control signal transmitter 183 outputs the data reception control signal 139 as the frame data valid signals and the line synchronization signals of the respective colors to the driver 151.

Figure 14:
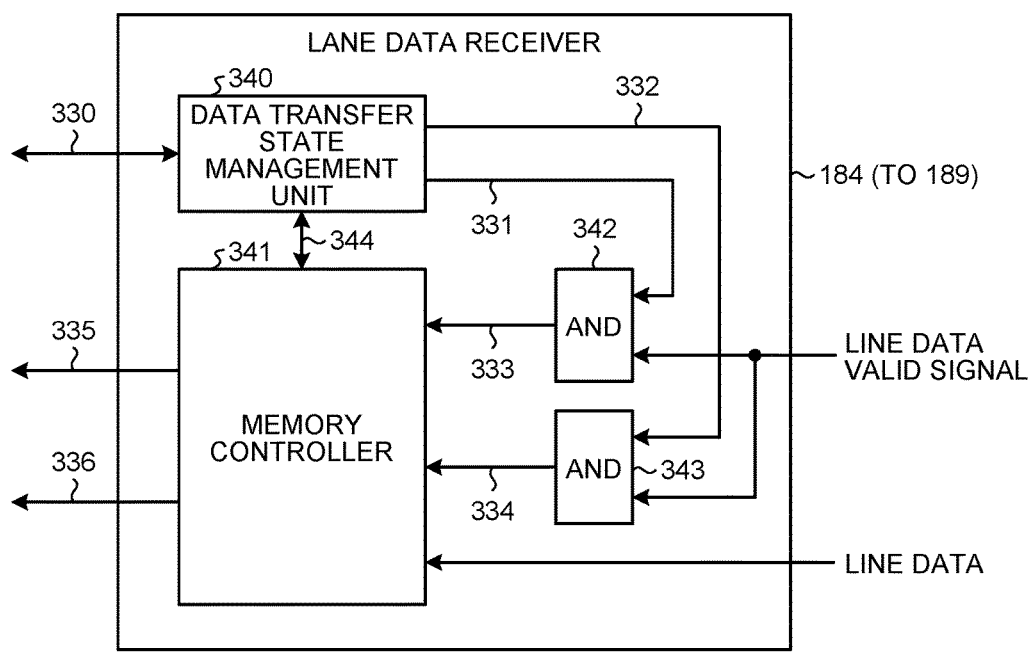
FIG. 14 is a block diagram illustrating an example configuration of a lane data receiver in FIG. 13.

FIG. 14 is a block diagram illustrating an example configuration of the lane data receiver in FIG. 13.

Each of the lane data receivers 184 to 189 includes a data transfer state management unit 340, a memory controller 341, and circuits 342 and 343.

The lane data receiver 185 for the Y/M common lane is described as an example.

The data transfer state management unit 340 receives assert permission notifications of the frame data valid signals of the Y version and the M version from the control signal transmitter 183 illustrated in FIG. 13 through the control line 330. In this case, the data transfer state management unit 340 receives pieces of image size information of the respective colors through the control line 330 simultaneously and notifies the memory controller 341 of the pieces of image size information through a control line 344.

The data transfer state management unit 340 outputs "1" to an output line 331 when the frame data valid signal of the Y version is asserted, and outputs "0" to the output line 331 when it is not asserted. In the same manner, the data transfer state management unit 340 outputs "1" to an output line 332 when the frame data valid signal of the M version is asserted, and outputs "0" to the output line 332 when it is not asserted.

The AND circuits 342 and 343 implement the AND operation of the Y/M line data valid signal and the output results to the output lines 331 and 332, respectively. AND outputs 333 and 334 can be considered as the line data valid signals for the colors sharing the common lane. This system uses no signal received by another lane unlike the configuration illustrated in FIG. 7 and is not therefore influenced by signal shifts due to the skew among the lanes.

The data transfer state management unit 340 illustrated in FIG. 14 receives a line synchronization signal assert permission notification through the control line 330 from the control signal transmitter 183 illustrated in FIG. 13. Then, the data transfer state management unit 340 notifies the memory controller 341 of start of reception of the line data of the corresponding color.

When the above-described line data valid signals of the respective colors serving as the AND outputs 333 and 334 of the common lane are "1", the memory controller 341 separates the received pieces of line data by color and writes pieces of line data 335 and 336 into the memories at a subsequent stage.

In this case, the memory controller 341 counts the numbers of pixels of the pieces of line data 335 and 336 written into the memories. When reception of the pieces of data for one line is completed, the memory controller 341 notifies the data transfer state management unit 340 of the counted numbers.

The data transfer state management unit 340 includes a received line number counter and increments the line counter when the pieces of line data are completely received. When a result of increment indicates that the pieces of data for the number of lines corresponding to the image size have been completely received, the data transfer state management unit 340 sets the signals of the output lines 331 and 332 to "0" in accordance with the colors for which data reception is completed.

Although the lane data receiver 185 for the Y/M common lane has been described above, the same holds true for the lane data receiver 188 for the C/K common lane.

Also in the lane data receivers for the independent lanes that are not the common lane, such as the lane data receiver 184 of the Y data transfer lane, operation modes of a common lane mode and an independent operation mode are preferably provided in registers (not illustrated in FIG. 14). The provision of the operation modes enable only a circuit of one color to operate with register setting.

Figure 15:
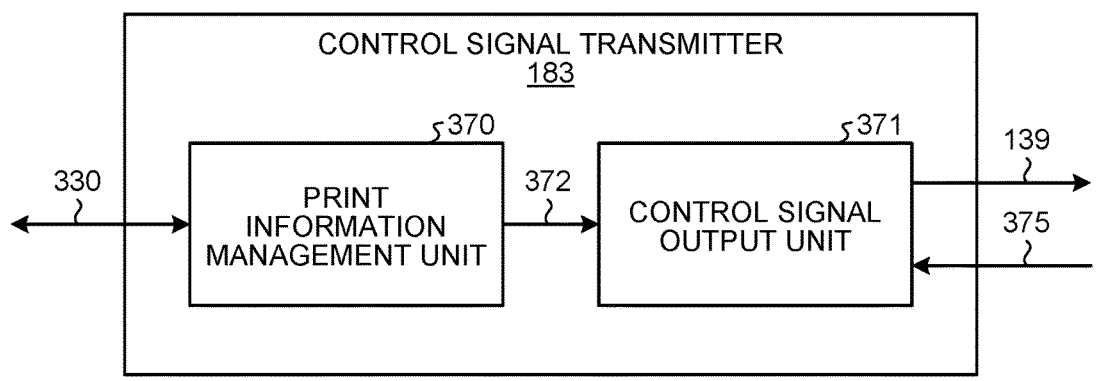
FIG. 15 is a block diagram illustrating an example configuration of a control signal transmitter in FIG. 13.

FIG. 15 is a block diagram illustrating an example configuration of the control signal transmitter 183 in FIG. 13.

The control signal transmitter 183 includes a print information management unit 370 and a control signal output unit 371. The print information management unit 370 receives print parameters (reception image sizes and image reception start requests for the respective colors) from a printer controller with a control I/F (not illustrated).

When the print information management unit 370 receives the above-described print parameters, it also issues, to the control signal output unit 371, image size notifications and asserts permission notifications of the frame data valid signals through a signal line 372, and subsequently issues assert permission notifications of the line synchronization signals. The print information management unit 370 also issues these notifications to the lane data receiver 184 and the like to which pieces of image data of the colors to be used for printing are transferred through the control line 330.

For example, when an image using the Y version and the M version is printed, the print information management unit 370 issues image size notifications of the Y version and assert permission notifications of the Y-version frame data valid signal to the lane data receivers 184 and 185 in FIG. 13. Furthermore, the print information management unit 370 issues image size notifications of the M version and assert permission notifications of the M-version frame data valid signal to the lane data receivers 185 and 186. After the assert permission notifications of the frame data valid signals of the Y version and the M version are completely transmitted, the print information management unit 370 issues assert permission notifications of the line synchronization signals in the same manner.

When the control signal output unit 371 receives the assert permission notifications of the frame data valid signals from the print information management unit 370, it asserts the frame data valid signals as the data reception control signal 139. Subsequently, when the control signal output unit 371 receives the assert notifications of the line synchronization signals, it asserts the line synchronization signals as the data reception control signal 139. Thereafter, the control signal output unit 371 checks the line data valid signal 375 of the appropriate lanes and deasserts the line synchronization signals after the line data valid signals are deasserted. The line data valid signal 375 collectively indicate the line data valid signals 303, 304, 307, 310, 311, and 314 of Y, Y/M, M, C, C/K, and K.

When the control signal output unit 371 outputs the line data synchronization signals, data transfer is restarted. When reception of the pieces of line data is completed, the lane data receivers notify the control signal output unit 371 of the completion of the reception of the pieces of line data through the control line 330. Subsequently, the control signal output unit 371 asserts the line synchronization signals so as to cause the lane data receivers to continue reception of the pieces of line data. When pieces of data for the number of lines corresponding to the image size are completely received, the control signal output unit 371 cancels the frame data valid signals.

Figure 16:
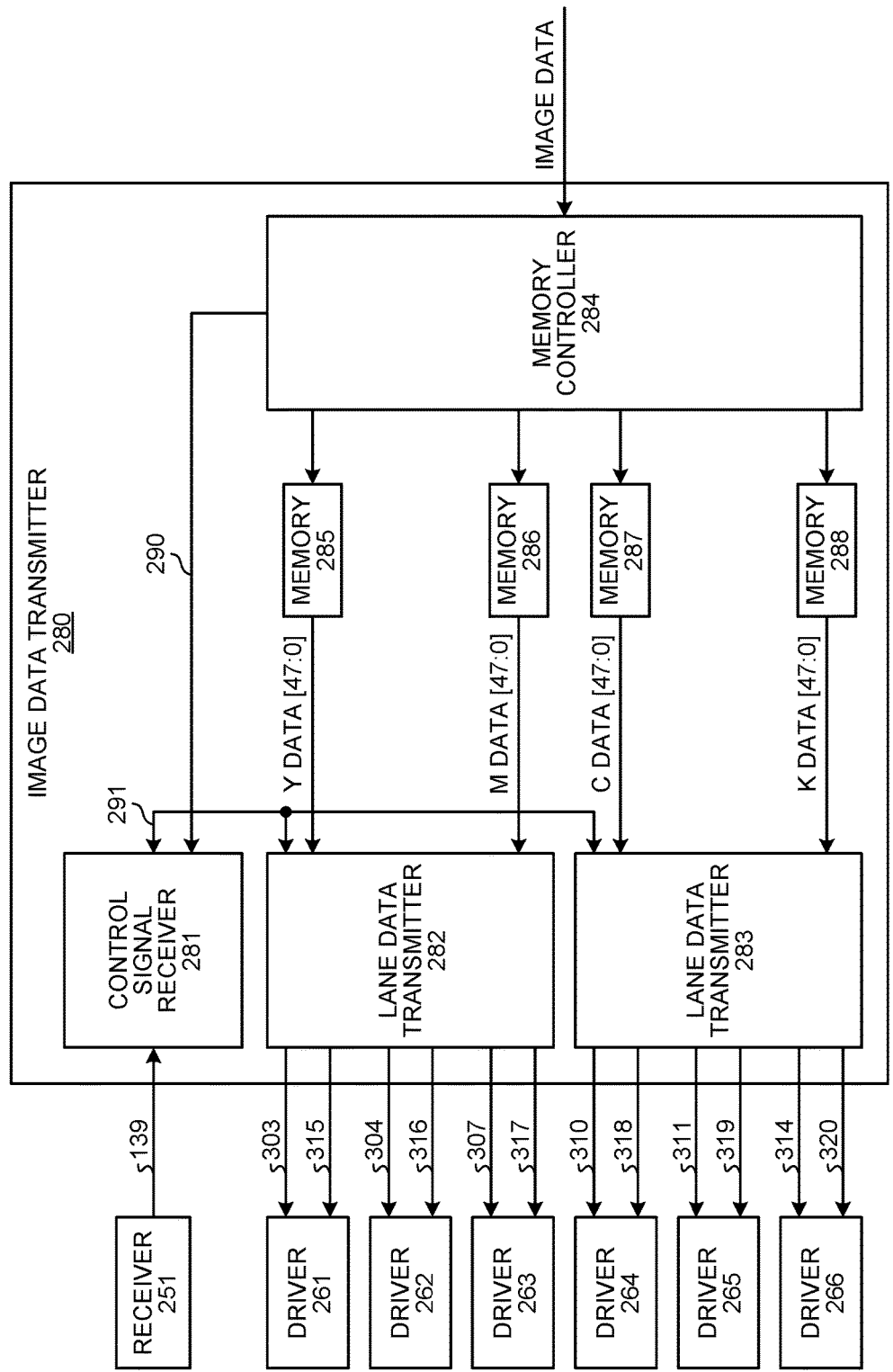
FIG. 16 is a block diagram illustrating an example configuration of an image data transmitter in the image processing system including the image data receiver illustrated in FIG. 13.

FIG. 16 is a block diagram illustrating an example configuration of an image data transmitter in the image processing system including the image data receiver 180 illustrated in FIG. 13.

An image data transmitter 280 illustrated in FIG. 16 corresponds to the communication I/F 205 of the print server 200 illustrated in FIG. 3.

The image data transmitter 280 includes a control signal receiver 281, lane data transmitters 282 and 283, a memory controller 284, and memories 285 to 288.

The memory controller 284 reads pieces of image data from the memory of the print server 200 in time with the printing operation and sequentially writes the pieces of image line data into the memories 285 to 288 for the respective colors.

The lane data transmitters 282 and 283 read Y data [47:0], M data [47:0], C data [47:0], and K data [47:0] from the respective memories 285 to 288 and output the pieces of data of the respective colors to the drivers 261 to 266 of the respective lanes.

The lane data transmitter 282 outputs the Y line data valid signal 303 and the Y data [31:0] 315 to the driver 261. The lane data transmitter 282 also outputs the Y/M line data valid signal 304 and the Y/M data [47:32] 316 to the driver 262 and outputs the M line data valid signal 307 and the M data [31:0] 317 to the driver 263.

The lane data transmitter 283 outputs the C line data valid signal 310 and the C data [31:0] 315 to the driver 264. The lane data transmitter 283 also outputs the C/K line data valid signal 311 and the C/K data [47:32] 319 to the driver 265 and outputs the K line data valid signal 314 and the K data [31:0] 320 to the driver 266.

The control signal receiver 281 receives the data reception control signal 139 through the driver 151 and the receiver 251 from the image data receiver 180 illustrated in FIG. 13 and controls the lane data transmitters 282 and 283. As described above, the data reception control signal 139 collectively indicates the frame data valid signals and the line synchronization signals of the respective colors illustrated in FIG. 5.

A control line 291 is connected to between the lane data transmitters 282 and 283 and the control signal receiver 281. The control line 291 enables the lane data transmitters 282 and 283 to receive data transfer temporary interrupt instructions and data transfer restart (start) instructions from the control signal receiver 281.

A signal line of the data reception control signal 139 that is output from the receiver and a control line 290 are connected to the control signal receiver 281 in addition to the above-described control line 291. The control line 290 enables the control signal receiver 281 to receive line data preparation states that are output from the memory controller 284.

The control signal receiver 281 receives, through the receiver 251, the data reception control signal 139 (the frame data valid signals and the line synchronization signals of the respective colors) that is transmitted through the driver 151 from the image data receiver 180 illustrated in FIG. 13.

When the line synchronization signals are asserted, the control signal receiver 281 issues the data transfer temporary interrupt instruction to the lane data transmitter 282 or 283 through the control line 291 when a lane that is transferring data is present. Thereafter, the control signal receiver 281 checks that the line synchronization signals are deasserted, and then, checks preparation states of the pieces of line data from the memory controller 284 through the control line 290.

Then, when the pieces of line data of colors that are transferred to any of the memories 285 to 288 are completely stored, the control signal receiver 281 issues the data transfer restart (start) instruction to the lane data transmitter 282 or 283 through the control line 291. When the pieces of line data are not completely stored, the control signal receiver 281 issues the data transfer restart (start) instruction to the lane data transmitter 282 or 283 after the pieces of line data are completely stored.

Figure 17:
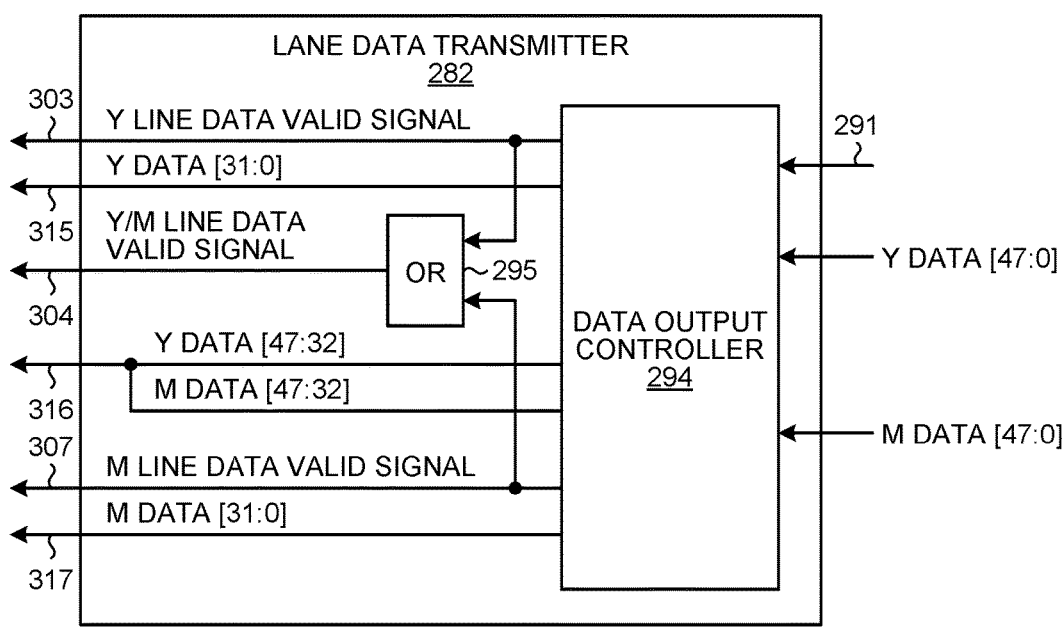
FIG. 17 is a block diagram illustrating an example configuration of a lane data transmitter 282 in FIG. 16.
Figure 18:
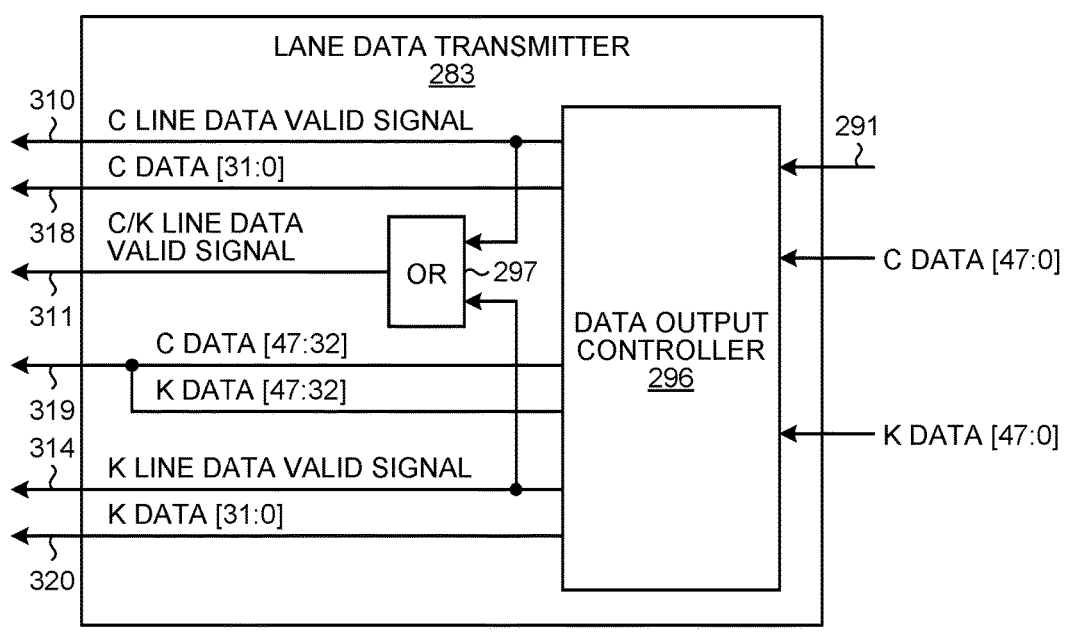
FIG. 18 is a block diagram illustrating an example configuration of a lane data transmitter 283 in FIG. 16.

The configurations of the lane data transmitters 282 and 283 will be described with reference to FIG. 17 and FIG. 18, respectively. FIG. 17 is a block diagram illustrating an example configuration of the lane data transmitter 282. FIG. 18 is a block diagram illustrating an example configuration of the lane data transmitter 283.

The lane data transmitter 282 includes a data output controller 294 and an OR circuit 295. The lane data transmitter 283 includes a data output controller 296 and an OR circuit 297.

The data output controllers 294 and 296 of the respective lane data transmitters 282 and 283 receive the data transfer temporary interrupt instructions and the data transfer restart (start) instructions from the control signal receiver 281 illustrated in FIG. 16 through the control line 291.

The data output controller 294 interrupts and restarts access to the memories 285 and 286 illustrated in FIG. 16, and the data output controller 296 to the memories 287 and 288 illustrated in FIG. 16, in accordance with the received data transfer temporary interrupt instructions and data transfer restart (start) instructions. The data output controller 294 divides the pieces of data of the respective colors that have been received from the memories 285 and 286 for the lanes and outputs them together with the line data valid signals, and the data output controller 296 does the same on the data from the memories 287 and 288. Pieces of data of sharing colors are transferred as pieces of data for the common lanes. The line data valid signals for the common lanes are provided by implementing the OR operation of the line data valid signals of the sharing colors.

The data output controllers 294 and 296 operate so as to output the line data valid signals and the pieces of color data of the respective lines in a synchronization manner when starting and restarting the data transfer.

In the lane data transmitter 282, the data output controller 294 receives the Y data [47:0] from the memory 285 and receives the M data [47:0] from the memory 286 as illustrated in FIG. 16, divides the pieces of data for the lanes, and outputs them together with the line data valid signals.

That is to say, the data output controller 294 outputs the Y data [31:0] 315 together with the Y line data valid signal 303 and outputs the M data [31:0] 317 together with the M line data valid signal 307. Furthermore, the data output controller 294 outputs the Y data [47:32] and the M data [47:32] and outputs them as the Y/M data [47:32] 316 collectively. The data output controller 294 inputs the Y line data valid signal 303 and the M line data valid signal 307 to the OR circuit 295 so as to implement the OR operation and outputs the result as the Y/M line data valid signal 304.

In the lane data transmitter 283, the data output controller 296 receives the C data [47:0] from the memory 287 and receives the K data [47:0] from the memory 288 as illustrated in FIG. 16, divides the pieces of data for the lanes, and outputs them together with the line data valid signals.

That is to say, the data output controller 296 outputs the C data [31:0] 318 together with the C line data valid signal 310 and outputs the K data [31:0] 320 together with the K line data valid signal 314. Furthermore, the data output controller 296 outputs the C data [47:32] and the K data [47:32] and outputs them as the C/K data [47:32] 319 collectively. The data output controller 296 inputs the C line data valid signal 310 and the K line data valid signal 314 to the OR circuit 297 so as to implement the OR operation and outputs the result as the C/K line data valid signal 311.

Figure 19:
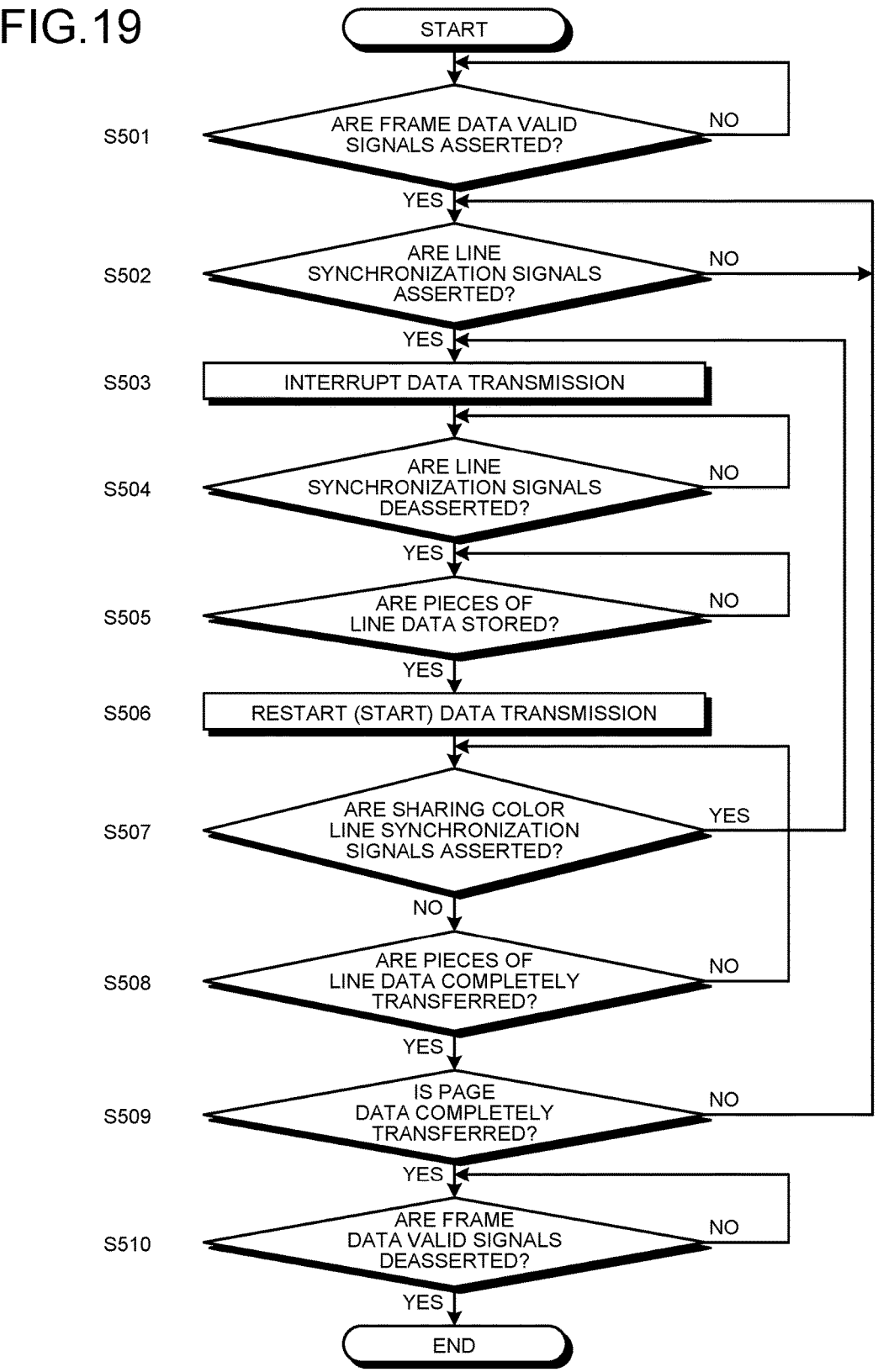
FIG. 19 is a flowchart illustrating a flow of control processing of an image data transmitter 280.

FIG. 19 is a flowchart illustrating a flow of control processing of the image data transmitter 280.

The units of the image data transmitter 280 illustrated in FIG. 16 execute this processing. The control signal receiver 281 mainly executes the processing upon reception of the data reception control signal 139 that is transmitted from the image data receiver 180 illustrated in FIG. 13. In practice, the CPU or the like in the print server 200 executes the processing. The data reception control signal 139 contains the frame data valid signals and the line synchronization signals of the respective colors.

When the image data transmitter 280 starts the processing illustrated in FIG. 19, the control signal receiver 281 stands by at step S501 until the image data receiver 180 illustrated in FIG. 13 asserts the frame data valid signals.

When the frame data valid signals are asserted, the control signal receiver 281 advances the processing to step S502 and stands by until the image data receiver 180 asserts the line synchronization signals. When the line synchronization signals are asserted, the control signal receiver 281 advances the processing to step S503. The control signal receiver 281 however performs no processing here because data transfer is not started in this case.

Also when the line synchronization signals of the sharing colors are determined to be asserted at step S507, the control signal receiver 281 advances the processing to step S503. In this case, the control signal receiver 281 causes the lane data transmitters 282 and 283 to temporarily interrupt the data transfer.

The sharing colors indicate colors sharing a lane. For example, the sharing colors indicate Y and M in the case of the Y/M lane.

Thereafter, the control signal receiver 281 stands by at step S504 until the image data receiver 180 deasserts the line synchronization signals.

When the line synchronization signals are deasserted, the control signal receiver 281 advances the processing to step S505 and stands by until the pieces of line data of the colors to be transferred are stored in the respective memories among the memories 285 to 288 illustrated in FIG. 16.

When the control signal receiver 281 determines that the pieces of line data of the colors to be transferred have been stored in the respective memories at step S505, it advances the processing to step S506 and restarts (starts) transmission of the pieces of line data. The data transfer is temporarily interrupted before preparation of the pieces of line data is completed at step S505. When the transfer of the pieces of line data is restarted (started), pieces of valid data are necessarily contained from the head. That is to say, a start position of each sharing color data can be specified by the common lane independently in the common lane.

At subsequent step S507, the control signal receiver 281 determines whether the line synchronization signals of the sharing colors are asserted while the pieces of line data are transferred. When the line synchronization signals of the sharing colors are asserted, the control signal receiver 281 causes the processing to return to step S503 as described above and interrupts data transmission.

When the line synchronization signals of the sharing colors are not asserted at step S507, the control signal receiver 281 causes the lane data transmitters 282 and 283 to transfer the pieces of data until the pieces of line data are determined to be completely transferred at step S508. Thus, the control signal receiver 281 causes the lane data transmitters 282 and 283 to transfer the pieces of line data until the pieces of line data are completely transferred while checking whether the line synchronization signals of the sharing colors are asserted at step S507.

Then, when the control signal receiver 281 determines that the pieces of line data are completely transferred at step 508, it determines whether page data is completely transferred at subsequent step S509. As a result, when the control signal receiver 281 determines that the page data is not completely transferred, it causes the processing to return to step S502 and waits for assert of the subsequent line synchronization signals. When the subsequent line synchronization signals are asserted, the control signal receiver 281 repeats the above-described pieces of processing.

When the control signal receiver 281 determines that the page data is completely transferred at step S509, it checks that the frame data valid signals are deasserted at step S510 and finishes the processing.

Figure 20:
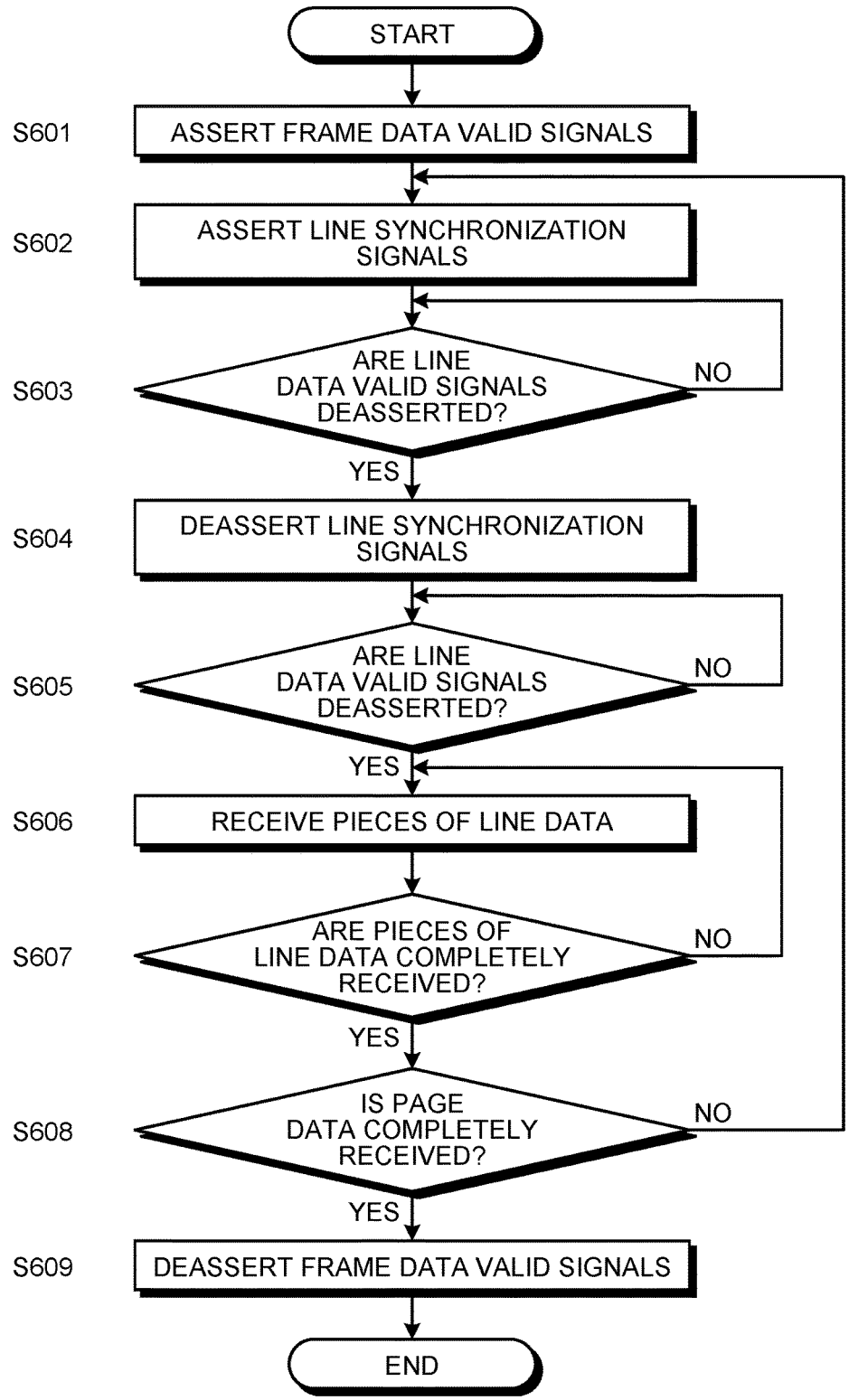
FIG. 20 is a flowchart illustrating a flow of control processing of the image data receiver 180.

FIG. 20 is a flowchart illustrating a flow of control processing of the image data receiver 180.

The units of the image data receiver 180 illustrated in FIG. 13 execute this processing. The control signal transmitter 183 mainly controls assert and deassert of the frame data valid signals and the line synchronization signals of the respective colors that are contained in the data reception control signal 139 transmitted to the image data transmitter 280 illustrated in FIG. 16. In practice, the CPU or the like in the image forming apparatus 100 executes the processing.

When the image data receiver 180 starts the processing illustrated in FIG. 20, the control signal transmitter 183 asserts the frame data valid signals at step S601.

Then, the control signal transmitter 183 asserts the line synchronization signals at step S602.

The control signal transmitter 183 stands by until the line data valid signals received from the image data transmitter 280 illustrated in FIG. 16 are deasserted at step S603.

When the line data valid signals are deasserted, the processing advances to step S604 and the image data receiver 180 deasserts the line synchronization signals.

Thereafter, the control signal transmitter 183 stands by until the line data valid signals received from the image data transmitter 280 are asserted at step S605.

When the line data valid signals are asserted, the control signal transmitter 183 causes the lane data receivers 184 to 189 to receive the pieces of line data for which the line data valid signals are asserted and to store them in the memories 190 to 197 for the respective colors at step S606.

Subsequently, the lane data receivers 184 to 189 continue reception of the pieces of line data until they completely receive the pieces of line data at step S607.

When the control signal transmitter 183 determines that the pieces of line data have been completely received at step S607, it determines whether page data has been completely received at subsequent step S608. As a result, when the page data has not been completely received, the processing returns to step S602 and the control signal transmitter 183 asserts the line synchronization signals again and starts subsequent data reception processing.

When the control signal transmitter 183 determines that the page data has been completely received at step S608, it deasserts the frame data valid signals at step S609 and finishes the processing.

Figure 21:
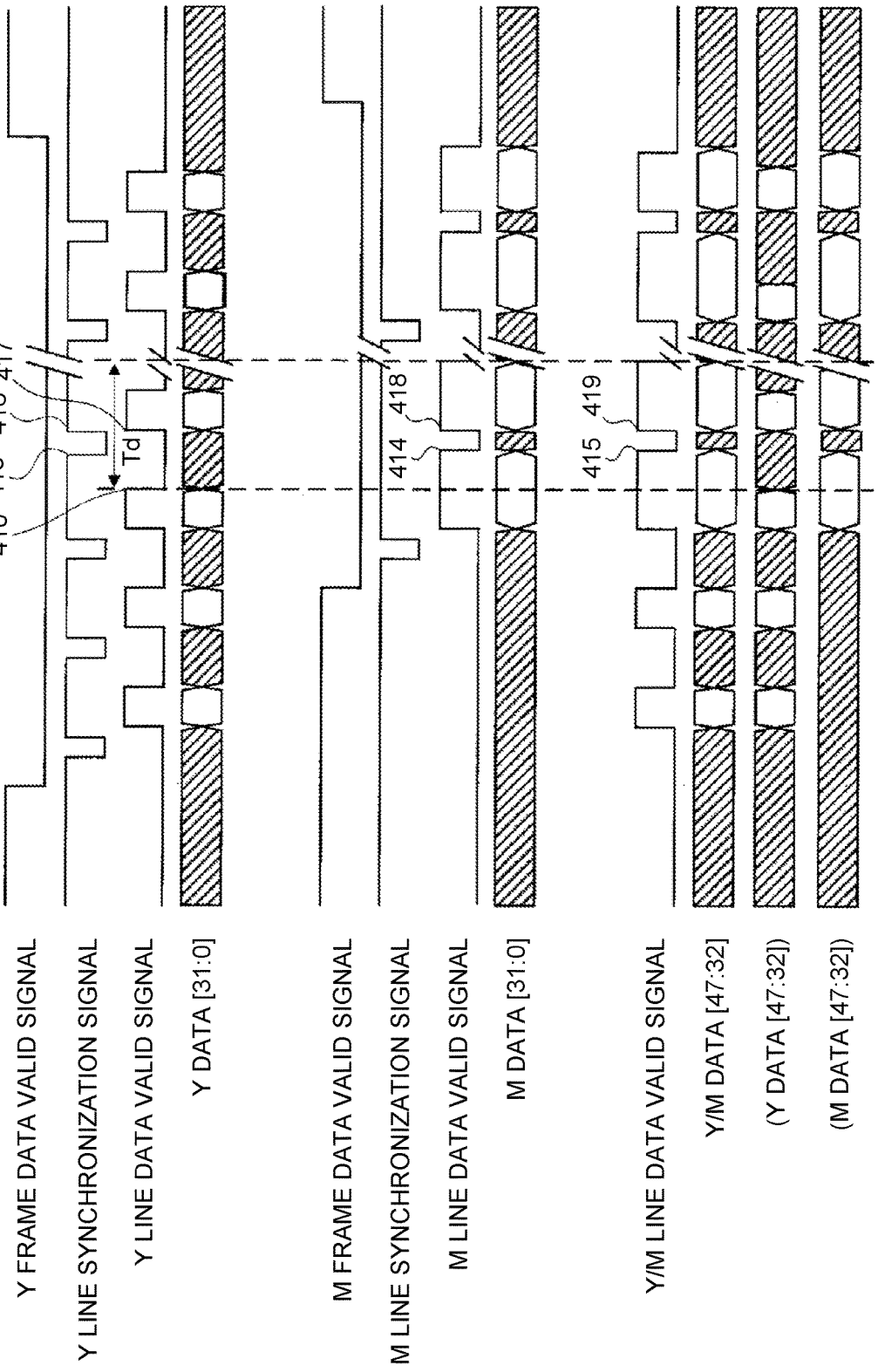
FIG. 21 is a timing chart illustrating reception waveforms of signals and pieces of data in the embodiment.

FIG. 21 is a timing chart illustrating reception waveforms of signals and pieces of data in this embodiment. This example illustrates waveforms when the Y data has a larger main scanning width of an image that is being received than that of the M data (Y data <M data).

When the Y data of the Y line and the M data of the M line start to be received simultaneously and the Y data is completely received at a time point 410, the Y line synchronization signal is asserted at a time point 413. The transfer of the M data of the M line and the Y/M data of the Y/M line are temporarily interrupted at time points 414 and 415, respectively, because the line synchronization signal of a sharing color is asserted. After the Y line synchronization signal is deasserted at a time point 416, transfer of the Y data, the M data, and the Y/M data are restarted at time points 417, 418, and 419, respectively, immediately after transfer of subsequent Y data of the Y line is completely prepared.

The Y/M data at the time of the transfer restart contains valid data of Y of a subsequent line from the head. As described with reference to FIG. 14, the lane data receivers 184 to 189 receive ANDs of states of the frame data valid signals and the line data valid signals as the pieces of valid data. The valid data can be grasped by the lane independently without being influenced by skew among the lanes. As described above, a valid data start position of the subsequent line data of Y can be easily grasped by the Y/M lane independently when the data transfer through the Y/M lane is restarted.

According to this embodiment, the subsequent line data of Y can be received in a time interval Td between the dashed lines, thereby preventing performance from lowering.

Although description of the embodiments is finished here, in the present invention, the specific configurations of apparatuses, the number of lanes that are used, the size of the transmission band, data contents that are transmitted, specific signal timings, and the like are not limited to those described in the embodiments.

For example, although the high-speed serial bus of six lanes is used for transmitting the pieces of image data in the above-described embodiments, the number of lanes is not limited thereto. An exclusive transmission line of two lanes and a common transmission line of one lane can be used for each color (each plane).

Although the transmission line of one lane is shared by two colors (two planes) in the above-described embodiments, the sharing manner is not limited thereto and a transmission line having one lane may be shared by three or more planes.

Figure 22:
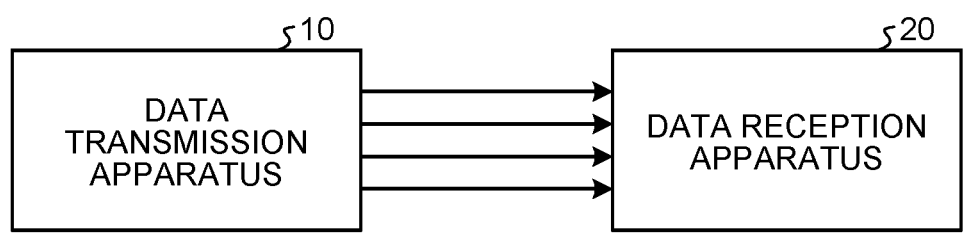
FIG. 22 is a diagram illustrating another example of apparatuses to which the invention is applied.

Furthermore, the pieces of data that are transmitted are not limited to pieces of image data of four colors and may be pieces of image data of two colors, three colors, and five or more colors. An image data transmission path is not limited to be used for transmission from the print server 200 to the image forming apparatus 100. The present invention can be applied to transmission between any apparatuses. That is to say, the present invention can be applied to data transmission to a data reception apparatus 20 from a certain data transmission apparatus 10 as illustrated in FIG. 22.

Even when audio or moving image data is transferred instead of image data, pieces of data having a plurality of planes can be transferred while utilizing a transmission band more efficiently by the same method.

Furthermore, it is needless to say that the configurations in the embodiments and modifications described above can be executed while being arbitrarily combined as long as they are consistent.

With the above-described configurations, when data having a plurality of planes are transmitted, a transmission band can be utilized more efficiently while keeping a transmission speed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image data transmission apparatus for transmitting image data of a plurality of planes, the image data transmission apparatus comprising:
   circuitry configured to:
   deliver the image data to a common transmission line used for transmitting the image data of the planes;
   generate first timing signals indicating transmission timings of the image data of the planes for the respective planes, and
   generate a second timing signal indicating a transmission timing of the image data in the common transmission line based on the first timing signals for the respective planes, the second timing signal being transmitted through the common transmission line.

2. The image data transmission apparatus according to claim 1, wherein the common transmission line is a serial bus, and ranges of a transmission band of the serial bus that are used for transmitting the image data of the respective planes are previously defined.

3. The image data transmission apparatus according to claim 1, wherein
   each of the first timing signals and the second timing signals contains a line data valid signal indicating a timing at which valid image data is transmitted to a transmission line, and
   the circuitry asserts the line data valid signal in the common transmission line when the line data valid signal is asserted for any of the planes for which the image data is transmitted through the common transmission line.

4. The image data transmission apparatus according to claim 1, wherein
   the circuitry also deliver the image data to an exclusive transmission line transmitting image data of one plane, and
   the circuitry divides the image data of one plane into a first part that is transmitted through the exclusive transmission line and a second part that is transmitted through the common transmission line, and delivers the first part to the exclusive transmission line and delivers the second part to the common transmission line simultaneously in accordance with one synchronization signal from a transmission target apparatus of the image data.

5. An image data transmission method of transmitting image data of a plurality of planes, the image data transmission method comprising:
- using a common transmission line that is used for transmitting the image data of the planes as a transmission line for transmitting the pieces of image data;
- generating first timing signals indicating transmission timings of the image data of the planes for the respective planes, and
- generating a second timing signal indicating a transmission timing of the image data, the second timing signal being transmitted in the common transmission line based on the first timing signals for the planes that are transmitted through the common transmission line.

6. An image processing system configured to include a plurality of apparatuses and transmits image data of a plurality of planes between the apparatuses, the image processing system comprising:
- a common transmission line configured to be used for transmitting the image data of the planes; the common transmission line serving as a transmission line for transmitting the image data between the apparatuses, and
- circuitry configured to:
  - generate first timing signals indicating transmission timings of the pieces of image data of the planes for the respective planes, and
  - generate a second timing signal indicating a transmission timing of the image data in the common transmission line based on the first timing signals for the planes, the second timing signal being transmitted through the common transmission line.

7. The image processing system according to claim 6, wherein
- each of the first timing signals and the second timing signal includes a line data valid signal indicating a timing at which valid image data is transmitted to a transmission line, and
- at a reception side of the common transmission line, it is determined for each plane of the image data that the image data of the plane transmitted through the common transmission line in a period during which both of a line data valid signal of the plane and a line data valid signal in the common transmission line used for transmitting the image data of the plane are asserted is valid.

* * * * *